United States Patent
Seo et al.

(10) Patent No.: US 9,904,628 B2
(45) Date of Patent: Feb. 27, 2018

(54) MEMORY SYSTEM, HOST SYSTEM, AND METHOD OF PERFORMING WRITE OPERATION IN MEMORY SYSTEM

(71) Applicants: Man-Keun Seo, Hwaseong-si (KR); Kwang-Hoon Kim, Seoul (KR); Sang-Kyoo Jeong, Seoul (KR)

(72) Inventors: Man-Keun Seo, Hwaseong-si (KR); Kwang-Hoon Kim, Seoul (KR); Sang-Kyoo Jeong, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 455 days.

(21) Appl. No.: 14/533,655

(22) Filed: Nov. 5, 2014

(65) Prior Publication Data
US 2015/0149789 A1 May 28, 2015

(30) Foreign Application Priority Data
Nov. 27, 2013 (KR) .......... 10-2013-0145449

(51) Int. Cl.
*G06F 12/14* (2006.01)
*G06F 3/06* (2006.01)
*G06F 21/10* (2013.01)

(52) U.S. Cl.
CPC .......... *G06F 12/1408* (2013.01); *G06F 3/064* (2013.01); *G06F 3/0608* (2013.01); *G06F 3/0622* (2013.01); *G06F 3/0623* (2013.01); *G06F 3/0679* (2013.01); *G06F 21/10* (2013.01)

(58) Field of Classification Search
CPC ...... G06F 21/10; G06F 21/72; G06F 12/1408; G11B 20/0086
See application file for complete search history.

(56) References Cited

U.S. PATENT DOCUMENTS

| | | | |
|---|---|---|---|
| 6,577,254 B2 | 6/2003 | Rasmussen | |
| 8,135,902 B2 | 3/2012 | Kurashige | |
| 8,135,903 B1 | 3/2012 | Kan | |
| 2002/0063888 A1* | 5/2002 | Hisatake | H04N 1/32793 358/1.15 |
| 2004/0250009 A1* | 12/2004 | Chen | G06F 3/0608 711/103 |
| 2005/0223241 A1* | 10/2005 | Nakai | G06F 21/572 713/193 |
| 2010/0281340 A1* | 11/2010 | Franceschini | G06F 12/0246 714/763 |

(Continued)

FOREIGN PATENT DOCUMENTS

| | | |
|---|---|---|
| JP | 2005-195835 | 7/2005 |
| KR | 2007-094639 | 4/2007 |
| KR | 2011-0030071 | 3/2011 |

*Primary Examiner* — Ali Abyaneh
*Assistant Examiner* — Shaqueal Wade
(74) *Attorney, Agent, or Firm* — Volentine & Whitt, PLLC

(57) ABSTRACT

A write operation is performed in a memory system by encoding, in the memory system, original data transmitted from a host system, according to a first type of host command, to produce an encoding result, transmitting information about the encoding result to the host system after the encoding, and writing the encoding result or the original data into a nonvolatile memory device, according to a second host command, wherein the second host command is transmitted from the host system based on the information about the encoding result.

17 Claims, 26 Drawing Sheets

(56) References Cited

U.S. PATENT DOCUMENTS

| | | |
|---|---|---|
| 2011/0072276 A1 | 3/2011 | Lee et al. |
| 2011/0252183 A1 | 10/2011 | Cho et al. |
| 2011/0320915 A1 | 12/2011 | Khan |
| 2012/0054415 A1 | 3/2012 | Danilak |
| 2012/0131264 A1 | 5/2012 | Oikawa |
| 2012/0131266 A1 | 5/2012 | Cho et al. |
| 2012/0182163 A1 | 7/2012 | Cho et al. |
| 2012/0203955 A1 | 8/2012 | Kim et al. |
| 2014/0075098 A1* | 3/2014 | Uno ............... G06F 12/0246 711/103 |
| 2014/0229761 A1* | 8/2014 | Okubo ............ G06F 11/073 714/6.11 |
| 2015/0036236 A1* | 2/2015 | McCarty ........ G11B 20/00007 360/39 |

* cited by examiner (a)　　　　　　　　　(b)

(a)　　　　　　　　　　(b)

MEMORY SYSTEM, HOST SYSTEM, AND METHOD OF PERFORMING WRITE OPERATION IN MEMORY SYSTEM

CROSS-REFERENCE TO RELATED APPLICATIONS

This application claims priority under 35 U.S.C. § 119 to Korean Patent Application No. 10-2013-0145449 filed on Nov. 27, 2013, the subject matter of which is hereby incorporated by reference.

BACKGROUND OF THE INVENTION

The inventive concept relates generally to electronic memory technologies. More particularly, certain embodiments of the inventive concept relate to a memory system, a host system, and a method of performing a write operation in the memory system.

In a data processing system, an encryption process may be performed to protect stored data, or a data compression process may be performed to decrease the size of stored data. The compression and encryption processes are commonly performed in a host within the data processing system. Unfortunately, however, these processes tend to decrease overall system performance and increase power consumption due to arithmetic operations of the compression process or the encryption process. Accordingly, there is a general need for improved approaches to data compression and encryption that avoid at least the above shortcomings of conventional approaches.

SUMMARY OF THE INVENTION

In one embodiment of the inventive concept, a method comprises encoding, in a memory system, original data transmitted from a host system, according to a first type of host command, to produce an encoding result, transmitting information about the encoding result to the host system after the encoding, and writing the encoding result or the original data into a nonvolatile memory device, according to a second host command, wherein the second host command is transmitted from the host system based on the information about the encoding result.

In another embodiment of the inventive concept, a memory system comprises a nonvolatile memory device, and a memory controller that performs an operation of writing or reading data to or from the nonvolatile memory device. The memory controller comprises a random access memory comprising a first address area for supporting an encoding function and a second address area for storing data produced by the encoding function, an encoder that encodes data stored in the first address area to produce an encoding result and stores the encoding result in the second address area, and a processor that stores original data transmitted from a host system in the first address area of the random access memory according to a first type of host command, transmits information about the encoding result to the host system, and performs an operation of reading data from the random access memory according to a second host command based on the information about the encoding result and writing the read data into the nonvolatile memory device.

In yet another embodiment of the inventive concept, a host system comprises a random access memory that stores host data, and a central processing unit that generates a first type of host command for an encoding process in a memory system, transmits the first type of host command to the memory system, and generates a second host command based on information about an encoding result received from the memory system, and transmits the second host command to the memory system.

These and other embodiments of the inventive concept may prevent performance degradation that may otherwise occur in a system due to a data compression process or an encryption process, and they may also reduce power consumption of the system.

BRIEF DESCRIPTION OF THE DRAWINGS

The drawings illustrate selected embodiments of the inventive concept. In the drawings, like reference numbers indicate like features.

DETAILED DESCRIPTION

Embodiments of the inventive concept are described below with reference to the accompanying drawings. These embodiments are presented as teaching examples and should not be construed to limit the scope of the inventive concept.

The terms used herein are merely used to describe embodiments, and are not intended to limit the inventive concept. An expression used in the singular encompasses the plural form as well, unless indicated to the contrary. Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein. As used herein, the term "and/or" indicates any and all combinations of one or more of the associated listed items. Expressions such as "at least one of," where preceding a list of elements, modify the entire list of elements and do not modify the individual elements of the list.

Figure 1:
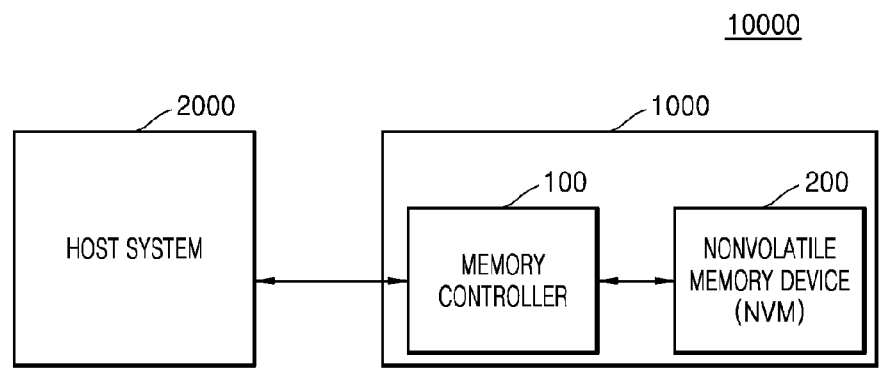
FIG. 1 is a block diagram of a data processing system according to an embodiment of the inventive concept.

FIG. 1 is a block diagram of a data processing system 10000 according to an embodiment of the inventive concept.

Referring to FIG. 1, data processing system 10000 comprises a memory system 1000 and a host system 2000. Memory system 1000 comprises a memory controller 100 and a nonvolatile memory device (NVM) 200. For example, a solid state drive (SSD) may be implemented using memory system 1000.

Host system 2000 generates a host command for storing data to memory system 1000 or reading data from memory system 1000, and it transmits the generated host command to memory system 1000.

Memory controller 100 processes data transmitted from host system 2000 according to the host command, and it performs a write operation for storing the processed data to nonvolatile memory device 200. Also, memory controller 100 may read data from nonvolatile memory device 200 according to the host command, and may process the read data and transmit the processed data to host system 2000.

Nonvolatile memory device 200 may be, e.g., a flash memory device, a phase change RAM (PRAM), a ferroelectric RAM (FRAM), a magnetic RAM (MRAM), or a combination thereof.

In some embodiments of the inventive concept, a first type of host command and a second host command are new commands that are generated in host system 2000. The first type of host command comprises various kinds of first commands.

The first type of host command is a command for performing an operation of encoding in memory controller 100 original data transmitted from host system 200. The second host command is a command for performing an operation of writing data encoded in memory controller 100 or original data transmitted from host system 200 into nonvolatile memory device 200. For example, the encoding may include data compression, data encryption, or the like. Based on the first type of host command, memory controller 100 generates information about an encoding result after the encoding process and transmits the information to host system 2000.

Figure 2:
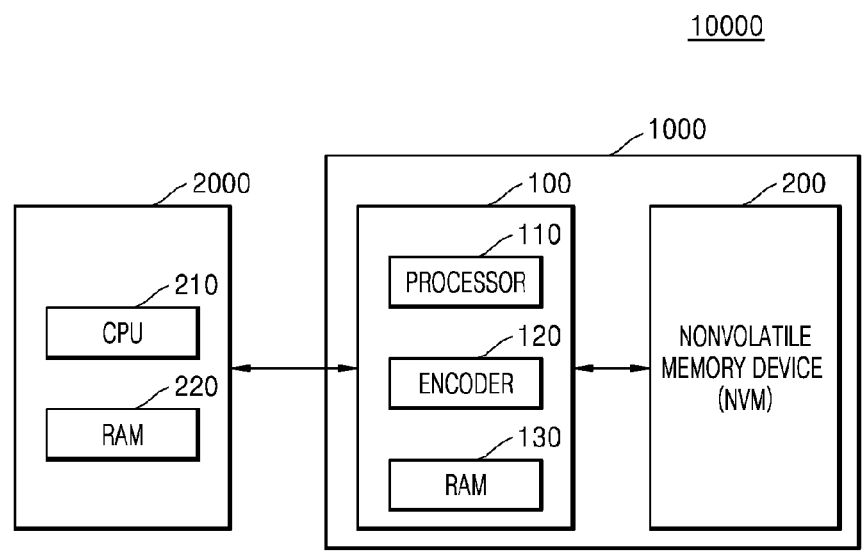
FIG. 2 is a more detailed block diagram of the data processing system of FIG. 1, according to an embodiment of the inventive concept.

FIG. 2 is a more detailed block diagram of the data processing system of FIG. 1, according to an embodiment of the inventive concept.

Referring to FIG. 2, memory controller 100 comprises a processor 110, an encoder 120, and a random access memory (RAM) 130. Host system 2000 comprises a central processing unit (CPU) 210 and a RAM 220.

Host data is stored in RAM 220. For example, RAM 200 may be a volatile memory, such as DRAM, SRAM, or the like. CPU 210 controls host system 2000 and executes arithmetic logic operations or data processing. Also, CPU 210 generates a host command for performing a write operation or a read operation in memory system 1000, and transmits the generated host command to memory system 1000.

CPU 210 generates the first type of host command based on the type of host data to be stored in memory system 1000, and transmits the first type of host command to memory system 1000. Also, CPU 210 generates the second host command based on the information about the encoding result received from memory system 1000 and transmits the second host command to memory system 1000.

The first type of host command is a command for performing an operation of writing host data to a storage area of RAM 130 allocated to support a compression function or an encryption function in memory system 1000. The second type of host command is a command for performing an operation of reading data stored in RAM 130 of memory system 1000 and writing the read data to NVM 200 of memory system 1000. The first type of host command does not designate logical address information, whereas the second host command designates logical address information.

The first type of host command may include a first A host command COMP CMD for performing an operation of writing host data to a storage area of RAM 130 allocated to support a compression function in memory system 1000. The first type of host command may include a first B host command ENCR CMD for performing an operation of writing host data to a storage area of RAM 130 that supports an encryption function in memory system 1000. Also, the first type of host command may include a first C host command COMP/ENCR CMD for performing an operation of writing host data to a storage area of RAM 130 which supports a compression function and an encryption function in memory system 1000.

Where encoder 120 of memory system 1000 supports various kinds of compression engines, the first A host command COMP CMD or the first C host command COMP/ENCR CMD may include information for designating one of the various kinds of compression engines supported by encoder 120.

Based on the type of host data to be stored in the memory system, CPU 210 may generate the first A host command COMP CMD with respect to host data belonging to data of a first group of which an expected compression rate is greater than or equal to a second threshold value, and may generate a write command WRITE COM with respect to host data belonging to data of a second group of which an expected compression rate is less than the second threshold value. CPU 210 may determine the expected compression rate based on the type of host data. The write command comprises information for designating a logical address. The host data (original data) is stored in a storage area of RAM 130 of memory system 1000 which does not support a compression function.

After CPU 210 receives the information about the encoding result that is received from memory system 1000, CPU 210 generates the second host command using the information about the encoding result. In the current embodiment, the second host command is defined as "RAM FLUSH CMD".

As an example, the information about the encoding result may include storage location information and size information for data encoded in memory system 1000 according to the first type of host command. As another example, the information about the encoding result may include storage location information and size information for at least one selected from among the data encoded in memory system 1000 according to the first type of host command and the host data (original data). As another example, the information about the encoding result may include storage location information and size information for target data selected from among data encoded in memory system 1000 and the host data (original data), based on a data compression result obtained according to an encoding process in memory system 1000.

Where the information about the encoding result comprises storage location information and size information for target data selected from among the encoded data and the host data (original data), CPU 210 generates second host command RAM FLUSH CMD that comprises the storage location information and size information for the target data and logical address information to be mapped to the target data, and transmits the generated second host command RAM FLUSH CMD to memory system 1000.

Where the information about the encoding result comprises both the storage location information and size information for the encoded data and the storage location information and size information for the host data (original data), CPU 210 calculates a data compression rate using the size information for the host data and the size information for the encoded data. Then, CPU 210 determines the encoded data as the target data where the calculated compression rate is greater than or equal to a first threshold value, and determines the host data as the target data where the calculated compression rate is less than the first threshold value. Next, CPU 210 generates second host command RAM FLUSH CMD, which comprises storage location information and size information for the target data and logical address information to be mapped to the target data, and transmits the generated second host command to memory system 1000.

Processor 110 controls memory system 1000 and executes arithmetic logic operations or data processing according to a host command that is received from host system 2000. Original data transmitted from host system 2000 or data processed in encoder 120 is stored in RAM 130. In addition, data read from NVM 200 may also be stored in RAM 130. In the current embodiment, a portion of the storage area of RAM 130 may be allocated to support a compression function or an encryption function.

Figure 3A:
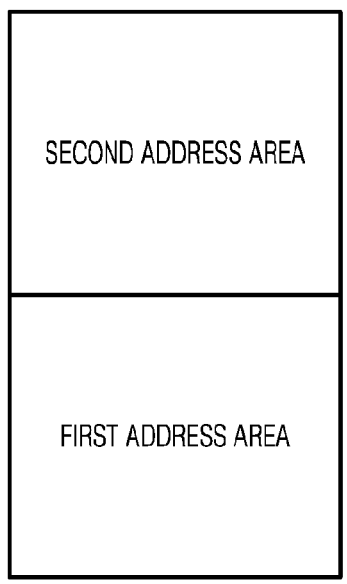
FIG. 3A is a diagram showing a storage area allocation of a random access memory (RAM) in a memory system illustrated in FIG. 2, according to an embodiment of the inventive concept.
Figure 3B:
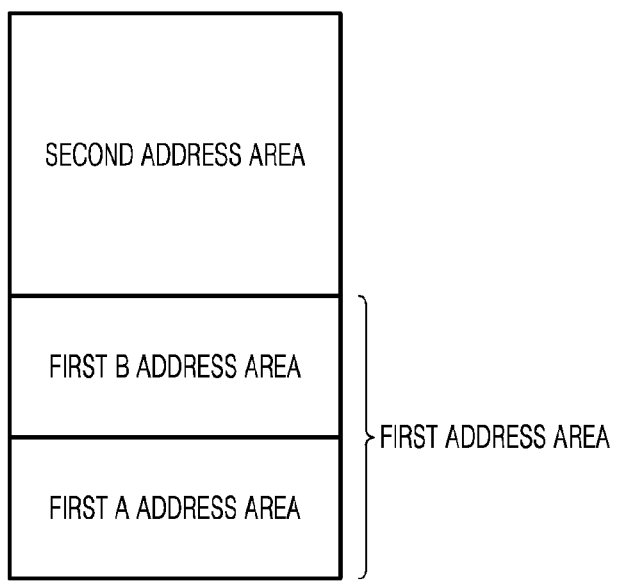
FIG. 3B is a diagram showing a storage area allocation of the RAM in the memory system illustrated in FIG. 2, according to another embodiment of the inventive concept.
Figure 3C:
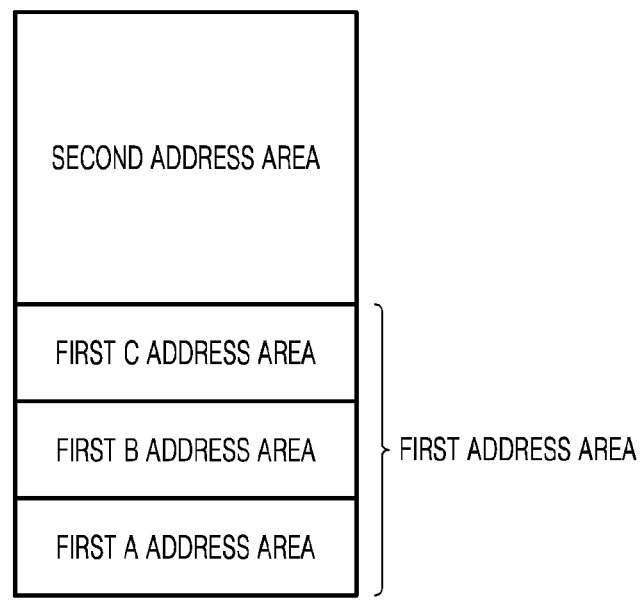
FIG. 3C is a diagram showing a storage area allocation of the RAM in the memory system illustrated in FIG. 2, according to yet another embodiment of the inventive concept.

FIGS. 3A through 3C are diagrams showing various embodiments of the storage area allocation of RAM 130 in memory system 1000 illustrated in FIG. 2. In FIGS. 3A through 3C, RAM 130 may be represented as a RAM 130A, a RAM 130B, and a RAM 130C depending on the allocation scheme of a storage area.

Referring to FIG. 3A, a storage area of RAM 130A is divided into a first address area for supporting an encoding function and a second address area for storing encoded data.

The first address area may be an area for supporting a compression function or an area for supporting an encryption function.

Referring to FIG. 3B, a storage area of RAM 130B is divided into a first address area for supporting an encoding function and a second address area for storing encoded data. The first address area may be subdivided into a first A address area for supporting a compression function and a first B address area for supporting an encryption function.

Referring to FIG. 3C, a storage area of RAM 130C is divided into a first address area for supporting an encoding function and a second address area for storing encoded data. The first address area may be subdivided into a first A address area for supporting a compression function, a first B address area for supporting an encryption function, and a first C address area for supporting a compression and encryption function.

Data transmitted from host system 2000 or data read from nonvolatile memory device 200 may be stored in the second address areas of RAM 130A through RAM 130C to perform a host command other than the first type of host command.

Referring again to FIG. 2, encoder 120 performs an operation of encoding data stored in the first address area of RAM 130 and storing the encoded data into the second address area of RAM 130. For example, under the control of processor 110, encoder 120 may encode data read from the first address area of RAM 130 and then store the encoded data into the second address area of RAM 130. The encoding process of encoder 120 may include a compression process or an encryption process.

For example, encoder 120 performs a compression process on data stored in a storage area of RAM 130 allocated to support a compression function. Encoder 120 performs an encryption process on data stored in a storage area of RAM 130 which supports an encryption function. Encoder 120 sequentially performs a compression process and an encryption process on data stored in a storage area of the RAM which supports a compression and encryption function.

Figure 4A:
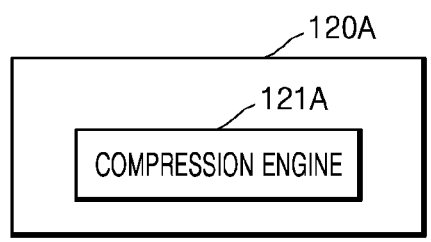
FIG. 4A is a diagram showing an encoder in the memory system illustrated in FIG. 2, according to an embodiment of the inventive concept.
Figure 4B:
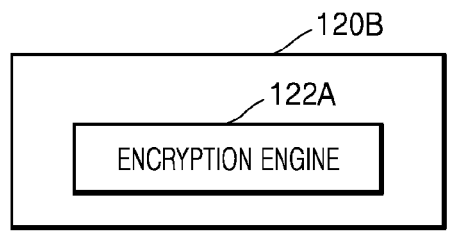
FIG. 4B is a diagram showing an encoder in the memory system illustrated in FIG. 2, according to another embodiment of the inventive concept.
Figure 4C:
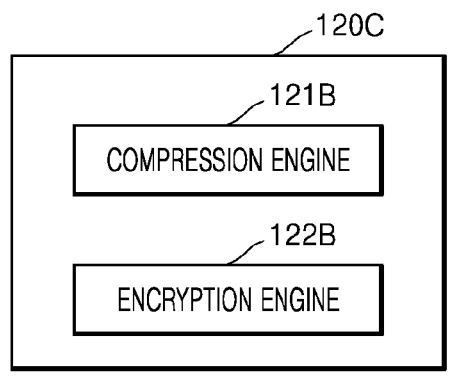
FIG. 4C is a diagram showing an encoder in the memory system illustrated in FIG. 2, according to yet another embodiment of the inventive concept.
Figure 4D:
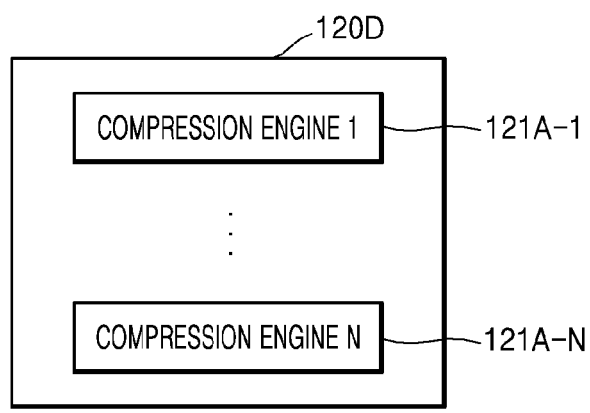
FIG. 4D is a diagram showing an encoder in the memory system illustrated in FIG. 2, according to yet another embodiment of the inventive concept.
Figure 4E:
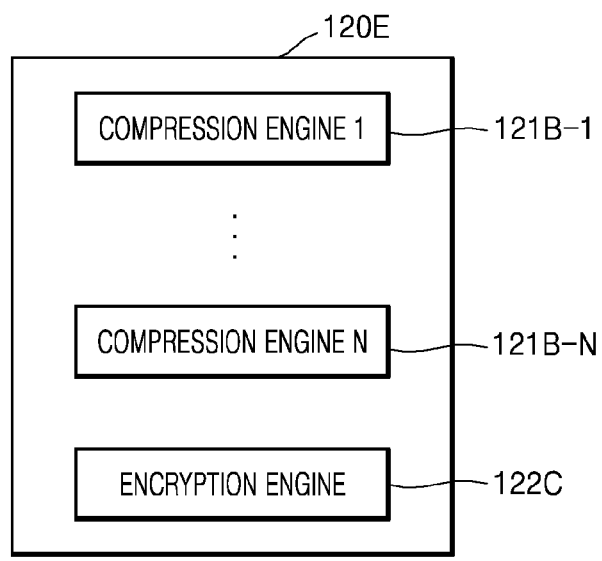
FIG. 4E is a diagram showing an encoder in the memory system illustrated in FIG. 2, according to yet another embodiment of the inventive concept.
Figure 4F:
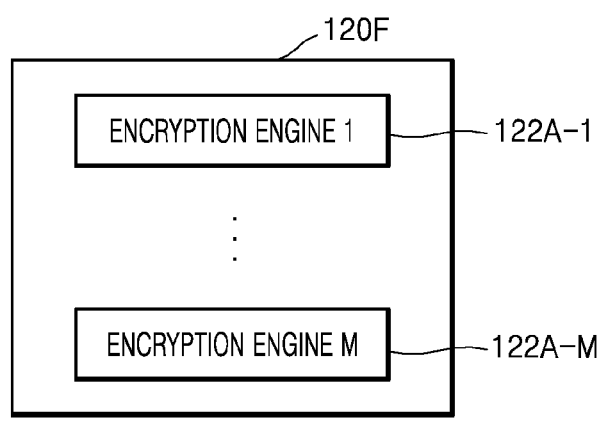
FIG. 4F is a diagram showing an encoder in the memory system illustrated in FIG. 2, according to yet another embodiment of the inventive concept.
Figure 4G:
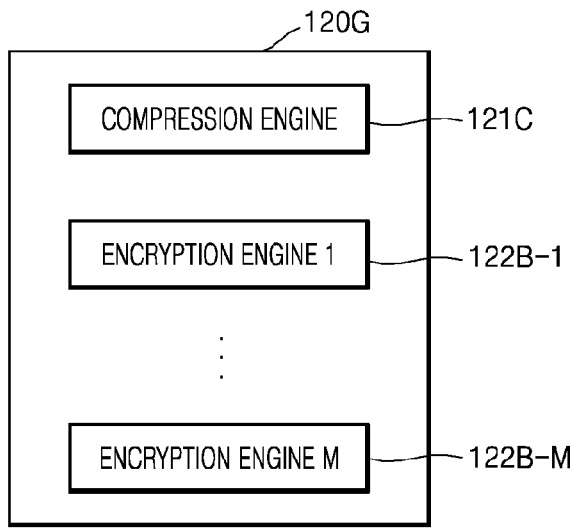
FIG. 4G is a diagram showing an encoder in the memory system illustrated in FIG. 2, according to yet another embodiment of the inventive concept.
Figure 4H:
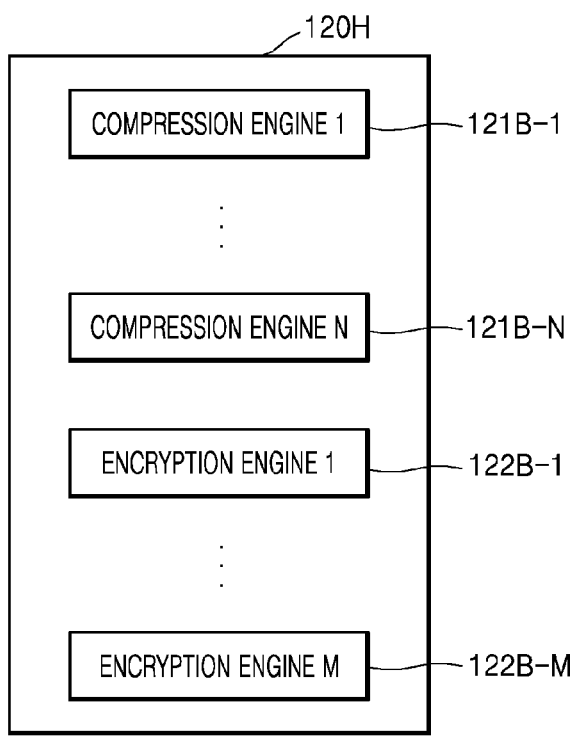
FIG. 4H is a diagram showing an encoder in the memory system illustrated in FIG. 2, according to yet another embodiment of the inventive concept.

FIGS. 4A through 4H are diagrams showing various embodiments of a detailed configuration of encoder 130 in memory system 1000 illustrated in FIG. 2. In FIGS. 4H through 4H, encoder 120 may be represented as encoders 120A through 120H depending on the configuration of encoder 120.

Referring to FIG. 4A, encoder 120A comprises a single compression engine 121. For example, compression engine 121A may use a compression algorithm such as the Deflate algorithm, Huffman algorithm, Arithmetic Coding algorithm, and the like.

Compression engine 121A performs a compression process on data stored in a storage area of RAM 130 that supports a compression function. For example, compression engine 121A compresses data stored in the first address area of RAM 130A illustrated in FIG. 3A, data stored in the first A address area of RAM 130B illustrated in FIG. 3B, or data stored in the first A address area of RAM 130C illustrated in FIG. 3C, and stores the compressed data in the second address area of RAM 130A, RAM 130B, or RAM 130C.

Referring to FIG. 4B, encoder 120B comprises a single encryption engine 122A. For example, encryption engine 122A may use one of various algorithms, such as Data Encryption Standard (DES) algorithm, Advanced Encryption Standard (AES) algorithm, Rivest Shamir Adleman (RSA) algorithm, and the like.

Encryption engine 122A performs an encryption process on data stored in a storage area of RAM 130 that supports the encryption function. For example, encryption engine 122A encrypts data stored in the first address area of RAM 130A illustrated in FIG. 3A, data stored in the first B address area of RAM 130B illustrated in FIG. 3B, or data stored in the first B address area of RAM 130C illustrated in FIG. 3C, and stores the encrypted data in the second address area of RAM 130A, RAM 130B, or RAM 130C.

Referring to FIG. 4C, encoder 120C comprises a compression engine 121B and an encryption engine 122B.

Compression engine 121B may use a compression algorithm such as the Deflate algorithm, Huffman algorithm, Arithmetic Coding algorithm, and the like. Encryption engine 122B may use one of various algorithms, such as the DES algorithm, AES algorithm, RSA algorithm, and the like.

Compression engine 121B performs a compression process on data stored in a storage area of RAM 130 allocated to support the compression function. For example, compression engine 121B compresses data stored in the first address area of RAM 130A illustrated in FIG. 3A, data stored in the first A address area of RAM 130B illustrated in FIG. 3B, or data stored in the first A address area of RAM 130C illustrated in FIG. 3C, and stores the compressed data in the second address area of RAM 130A, RAM 130B, or RAM 130C. Compression engine 121B compress data stored in the first C address area of RAM 130C illustrated in FIG. 3C, and stores the compressed data in the first B address area of RAM 130C.

Encryption engine 122B performs an encryption process on data stored in a storage area of RAM 130 that supports the encryption function. For example, encryption engine 122B encrypts data stored in the first address area of RAM 130A illustrated in FIG. 3A, data stored in the first B address area of RAM 130B illustrated in FIG. 3B, or data stored in the first B address area of RAM 130C illustrated in FIG. 3C, and stores the encrypted data in the second address area of RAM 130A, RAM 130B, or RAM 130C.

Referring to FIG. 4D, encoder 120D comprises multiple compression engines 121A-1 through 121A-N, where N is a natural number that is greater than or equal to 2. Compression engines 121A-1 through 121A-N may use two or more of compression algorithms, such as Deflate algorithm, Huffman algorithm, Arithmetic Coding algorithm, and the like.

Based on compression engine designation information in the first type of host command, processor 110 may select one of compression engines 121A-1 through 121A-N in encoder 120D. In detail, one of compression engines 121A-1 through 121A-N in encoder 120D may be selected based on the compression engine designation information in the first A host command COMP CMD.

A compression engine selected from among compression engines 121A-1 through 121A-N based on the compression engine designation information in the first A host command COMP CMD performs a compression process on data stored in a storage area of RAM 130 allocated to support a compression function. For example, the selected compression engine compresses data stored in the first address area of RAM 130A illustrated in FIG. 3A, data stored in the first A address area of RAM 130B illustrated in FIG. 3B, or data stored in the first A address area of RAM 130C illustrated in FIG. 3C, and also stores the compressed data in the second address area of RAM 130A, RAM 130B, or RAM 130C.

Referring to FIG. 4E, encoder 120E comprises multiple compression engines 121B-1 through 121B-N and an encryption engine 122C.

Compression engines 121B-1 through 121B-N may use two or more compression algorithms, such as the Deflate algorithm, Huffman algorithm, Arithmetic Coding algorithm, and the like. Encryption engine 122C may use one of various algorithms, such as the DES algorithm, AES algorithm, RSA algorithm, and the like.

Processor 110 may select one of compression engines 121B-1 through 121B-N in encoder 120E based on compression engine designation information in the first type of host command. In detail, one of compression engines 121B-1 through 121B-N in encoder 120E may be selected based on compression engine designation information in the first A host command COMP CMD or the first C host command COMP/ENCR.

A compression engine selected based on the compression engine designation information in the first A host command COMP CMD performs a compression process on data stored in a storage area of RAM 130 allocated to support the compression function. A compression engine selected from compression engines 121B-1 through 121B-N compresses data stored in the first address area of RAM 130A illustrated in FIG. 3A, data stored in the first A address area of RAM 130B illustrated in FIG. 3B, or data stored in the first A address area of RAM 130C illustrated in FIG. 3C, and stores the compressed data in the second address area of RAM 130A, RAM 130B, or RAM 130C. A compression engine selected based on the compression engine designation information in the first C host command COMP/ENCR CMD compresses data stored in the first C address area of RAM 130C illustrated in FIG. 3C, and stores the compressed data in the first B address area of RAM 130C.

Encryption engine 122C performs an encryption process on data stored in a storage area of RAM 130 that supports the encryption function. For example, encryption engine 122C encrypts data stored in the first address area of RAM 130A illustrated in FIG. 3A, data stored in the first B address area of RAM 130B illustrated in FIG. 3B, or data stored in the first B address area of RAM 130C illustrated in FIG. 3C, and stores the encrypted data in the second address area of RAM 130A, RAM 130B, or RAM 130C.

Referring to FIG. 4F, encoder 120F comprises multiple encryption engines 122A-1 through 122A-M, where M is a natural number that is greater than or equal to 2. Encryption engines 122A-1 through 122A-M may use two or more of various algorithms, such as the DES algorithm, AES algorithm, RSA algorithm, and the like.

Based on encryption engine designation information in the first type of host command, processor 110 may select one of encryption engines 122A-1 through 122A-M in encoder 120F. In detail, one of encryption engines 122A-1 through 122A-M in encoder 120F may be selected based on the encryption engine designation information in the first B host command ENCR CMD.

An encryption engine selected from among encryption engines 122A-1 through 122A-M based on the encryption engine designation information in the first B host command ENCR CMD performs an encryption process on data stored in a storage area of RAM 130 allocated to support the encryption function. For example, the selected encryption engine encrypts data stored in the first address area of RAM 130A illustrated in FIG. 3A, data stored in the first B address area of RAM 130B illustrated in FIG. 3B, or data stored in the first B address area of RAM 130C illustrated in FIG. 3C, and stores the encrypted data in the second address area of RAM 130A, RAM 130B, or RAM 130C.

Referring to FIG. 4G, encoder 120G comprises a compression engine 121C and multiple encryption engines 122B-1 through 122B-M, where M is a natural number that is greater than or equal to 2.

Compression engine 121C may use a compression algorithm, such as the Deflate algorithm, Huffman algorithm, Arithmetic Coding algorithm, and the like. Encryption engines 122B-1 through 122B-M may use two or more of various algorithms, such as DES algorithm, AES algorithm, RSA algorithm, and the like.

Compression engine 121C performs a compression process on data stored in a storage area of RAM 130 allocated to support the compression function. For example, compression engine 121C compresses data stored in the first address area of RAM 130A illustrated in FIG. 3A, data stored in the first A address area of RAM 130B illustrated in FIG. 3B, or data stored in the first A address area of RAM 130C illustrated in FIG. 3C, and stores the compressed data in the second address area of RAM 130A, RAM 130B, or RAM 130C.

Compression engine 121C compress data stored in the first C address area of RAM 130C illustrated in FIG. 3C, and stores the compressed data in the first B address area of RAM 130C.

Processor 110 may select one of encryption engines 122B-1 through 122B-M in encoder 120G, based on encryption engine designation information in the first type of host command. In detail, one of encryption engines 122B-1 through 122B-M in encoder 120G may be selected based on encryption engine designation information in the first B host command ENCR CMD or the first C host command COMP/ENCR CMD.

An encryption engine selected from among encryption engines 122B-1 through 122B-M based on the encryption engine designation information in the first B host command ENCR CMD or the first C host command COMP/ENCR CMD performs an encryption process on data stored in a storage area of RAM 130 allocated to support the encryption function. For example, the selected encryption engine encrypts data stored in the first address area of RAM 130A illustrated in FIG. 3A, data stored in the first B address area of RAM 130B illustrated in FIG. 3B, or data stored in the first B address area of RAM 130C illustrated in FIG. 3C, and stores the encrypted data in the second address area of RAM 130A, RAM 130B, or RAM 130C.

Referring to FIG. 4H, encoder 120H comprises multiple compression engines 121B-1 through 121B-N and multiple encryption engines 122B-1 through 122B-M, where N and M are natural numbers that are greater than or equal to 2.

Compression engines 121B-1 through 121B-N may use two or more of compression algorithms, such as the Deflate algorithm, Huffman algorithm, Arithmetic Coding algorithm, and the like. Encryption engines 122B-1 through 122B-M may use two or more of various algorithms, such as DES algorithm, AES algorithm, RSA algorithm, and the like.

Based on compression engine designation information in the first type of host command, processor 110 may select one of compression engines 121B-1 through 121B-N in encoder 120H. In detail, one of compression engines 121B-1 through 121B-N in encoder 120E may be selected based on compression engine designation information in the first A host command COMP CMD or the first C host command COMP/ENCR.

A compression engine selected based on the compression engine designation information in the first A host command COMP CMD performs a compression process on data stored in a storage area of RAM 130 allocated to support the compression function. A compression engine selected from compression engines 121B-1 through 121B-N compresses data stored in the first address area of RAM 130A illustrated in FIG. 3A, data stored in the first A address area of RAM 130B illustrated in FIG. 3B, or data stored in the first A address area of RAM 130C illustrated in FIG. 3C, and stores the compressed data in the second address area of RAM 130A, RAM 130B, or RAM 130C. A compression engine selected based on the compression engine designation information in the first C host command COMP/ENCR CMD compresses data stored in the first C address area of RAM 130C illustrated in FIG. 3C, and stores the compressed data in the first B address area of RAM 130C.

Processor 110 may select one of encryption engines 122B-1 through 122B-M in encoder 120G based on encryption engine designation information in the first type of host command. In detail, one of encryption engines 122B-1 through 122B-M in encoder 120G may be selected based on encryption engine designation information in the first B host command ENCR CMD or the first C host command COMP/ENCR CMD.

An encryption engine selected from among encryption engines 122B-1 through 122B-M based on the encryption engine designation information in the first B host command ENCR CMD or the first C host command COMP/ENCR CMD performs an encryption process on data stored in a storage area of RAM 130 allocated to support the encryption function. For example, the selected encryption engine encrypts data stored in the first address area of RAM 130A illustrated in FIG. 3A, data stored in the first B address area of RAM 130B illustrated in FIG. 3B, or data stored in the first B address area of RAM 130C illustrated in FIG. 3C, and stores the encrypted data in the second address area of RAM 130A, RAM 130B, or RAM 130C.

Referring again to FIG. 2, encoder 120 encodes data stored in the first address area of RAM 130 according to the first type of host command and stores the encoded data in the second address area of RAM 130, and then processor 110 generates information about the encoded result and transmits the information to host system 2000.

As an example, the information about the encoded result generated by processor 110 may include storage location information and size information for encoded data, which is obtained by encoding host data (original data) stored in the first address area of RAM 130 according to the first type of host command and is stored in the second address area of RAM 130.

As another example, the information about the encoded result generated by processor 110 may include storage location information and size information for at least one selected from among host data, which is stored in the first address area of RAM 130 according to the first type of host command, and the encoded data, which is obtained by encoding the host data (original data) stored in the first address area of RAM 130 and is stored in the second address area of RAM 130.

As yet another example, the information about the encoded result which is generated by processor 110 may include storage location information and size information for target data selected based on a compression rate of an encoding process from among the host data (original data) stored in the first address area of RAM 130 according to the first type of host command and the encoded data stored in the second address area of RAM 130. The encoded data may be determined as the target data where the compression rate is greater than or equal to a first threshold value, and the host data (original data) may be determined as the target data where the compression rate is less than the first threshold value.

Where second host command RAM FLUSH CMD is received from host system 2000, processor 110 controls memory system 1000 so as to perform an operation of reading data from a storage area of RAM 130 of memory system 1000, which is designated by second host command RAM FLUSH CMD, and writing the read data to NVM 200.

Second host command RAM FLUSH CMD may include storage location information for target data stored in RAM 130 of memory system 1000, which is designated by information about encoded result, logical address information to be mapped to the target data, and size information for the target data.

Processor 110 converts the logical address information in second host command RAM FLUSH CMD into physical address information. Processor 110 reads target data from a storage location of RAM 130, which is designated by second host command RAM FLUSH CMD, and writes the read target data into a storage location of NVM 200 that corresponds to the physical address information.

Where write command WRITE CMD is received from host system 2000, processor 110 converts logical address information in write command WRITE CMD into physical address information. Processor 110 controls memory system 1000 so as to store host data, which is transmitted from host system 2000 according to write command WRITE CMD, in the second address area of RAM 130. Then, processor 110 reads the host data from the second address area of RAM 130, and writes the read host data to a storage location of NVM 200 that corresponds to the physical address information. Accordingly, the host data that is received according to write command WRITE CMD is written to NVM 200 without being compressed or encrypted.

Figure 5:
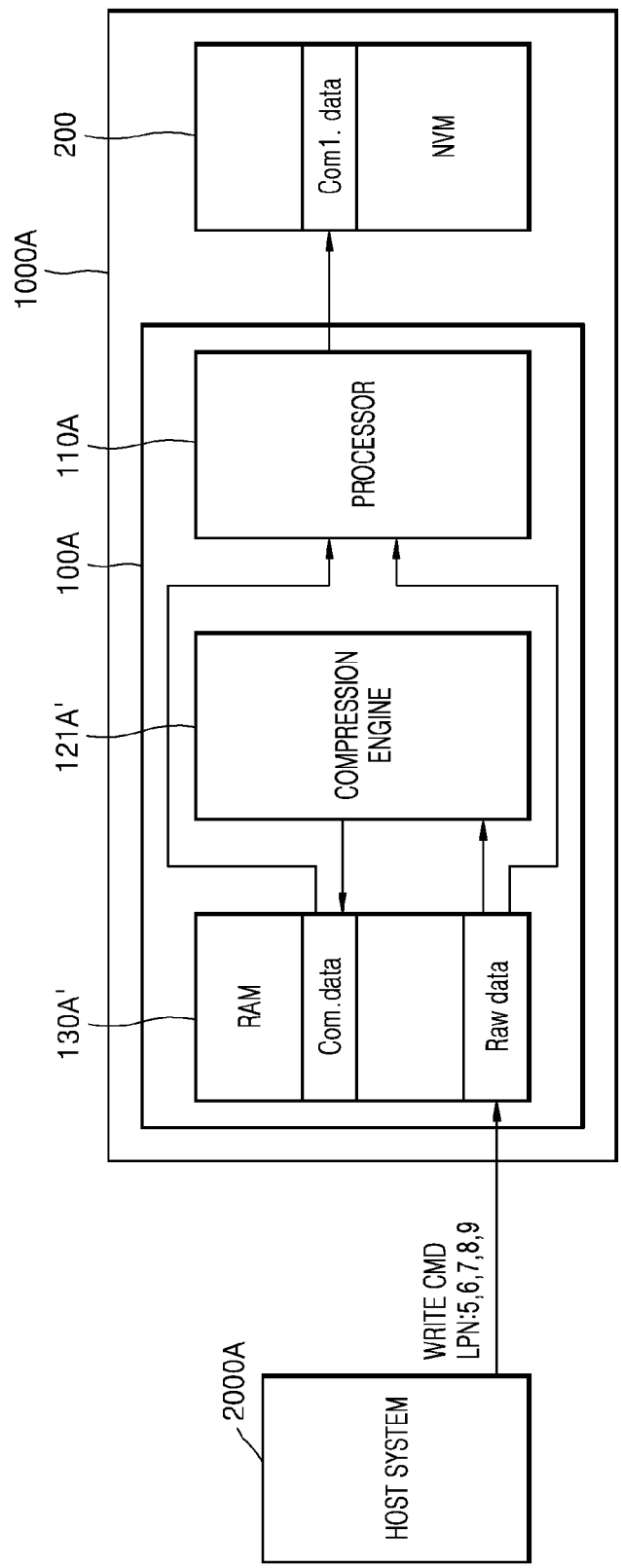
FIG. 5 is a diagram showing a signal processing flow for a data compression process, according to an embodiment of the inventive concept.

FIG. 5 is a diagram showing a signal processing flow for explaining a data compression process using a compression engine 121A' in an encoder of a memory system 1000A without changing a host system to perform a write operation, according to an embodiment of the inventive concept.

Referring to FIG. 5, memory system 1000A comprises a memory controller 100A and an NVM 200. Memory controller 100A comprises a processor 110A, a compression engine 121A', and a RAM 130A'.

It is not necessary to separately allocate in RAM 130A' a storage area supporting a compression function or an encryption function. Compression engine 121A' compresses host data stored in RAM 130A' under the control of processor 100A. Processor 100A manages a flash translation layer so as to map two logical pages, each having a compression rate of 50% or more, to one physical page.

Host system 2000A transmits a host command WRITE CMD for writing host data Raw data, which is designated by logical page numbers LPN 5 through LPN 9, to NVM 200 and the host data Raw data to memory system 1000A. Host command WRITE CMD comprises logical address information.

Accordingly, the host data Raw data designated by the logical page numbers LPN 5 through LPN 9 is stored in RAM 130A' of memory system 1000A.

Compression engine 121A' compresses the host data Raw data under the control of processor 110A, and stores the compressed data Com.data in RAM 130A'.

Figure 6:
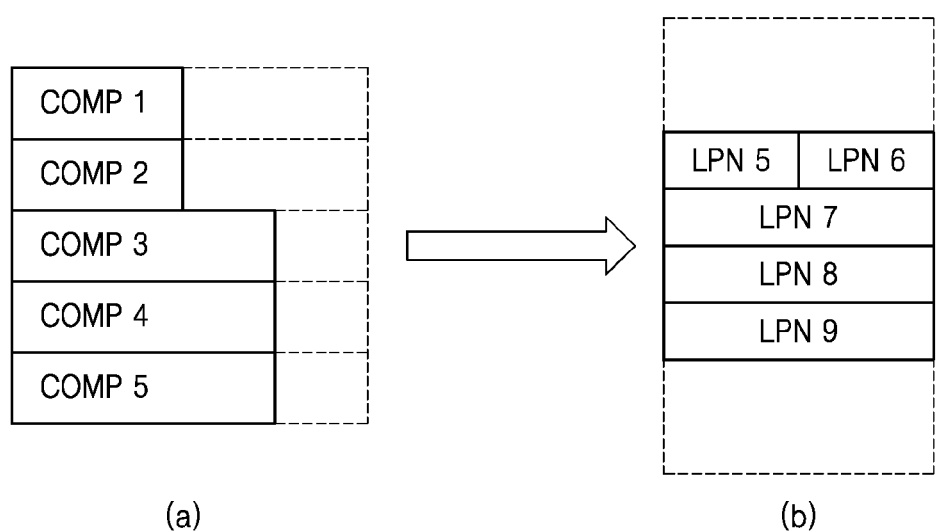
FIG. 6 is a diagram showing the form of data compressed in a memory controller of FIG. 5, and the form of data stored in a nonvolatile memory of FIG. 5, according to an embodiment of the inventive concept.

For example, the form of data compressed by compression engine 121A' of memory controller 100A is illustrated in FIG. 6, part (a). In FIG. 6, part (a), compression results for the host data designated by the logical page numbers LPN 5 and LPN 6 are denoted by COMP 1 and COMP 2, and compression results for the host data designated by the logical page numbers LPN 7 through LPN 9 are denoted by COMP 3 through COMP 5.

Referring to FIG. 6, part (a), it is understood that a compression rate for the host data designated by the logical page numbers LPN 5 and LPN 6 is 50% or more and a compression rate for the host data designated by the logical page numbers LPN 7 through LPN 9 is less than 50%.

Processor 110A performs an address conversion process for mapping two logical pages, each having a compression rate of 50% or more, to one physical page using the compression result shown in FIG. 6, part (a). With respect to logical pages of which compression rate is less than 50%, processor 110A performs an address conversion process for mapping a physical page on each of logical pages for host data that was not compressed.

Processor 110A controls memory system 1000A so as to selectively write compressed data of the logical pages or non-compressed host data into a storage location of NVM 200 that corresponds to a physical page obtained by performing the address conversion process. Accordingly, data Com1.data that is stored in NVM 200 has a form as shown in FIG. 6, part (b). That is, referring to FIG. 6, part (b), data for the logical page numbers LPN 5 and LPN 6, which is stored in NVM 200, is the compressed data Comp 1 and Comp2, and data for the logical page numbers LPN 7 through LPN 9, which is stored in NVM 200, is the non-compressed host data Raw data.

In the embodiment illustrated in FIG. 5, a compression process is unnecessarily performed on some data. For example, referring to FIGS. 6A and 6B, an unnecessary compression process is performed on the data for the logical page numbers LPN 7 through LPN 9, and thus, this unnecessary compression process causes a degradation of the performance degradation of memory system 1000A and an increase of the power consumption thereof.

In another embodiment of the inventive concept, a new host command is introduced to overcome the shortcoming of the embodiment illustrated in FIG. 5. In addition, a portion of the storage area of RAM 130 is allocated to support a compression function or an encryption function.

Figure 7:
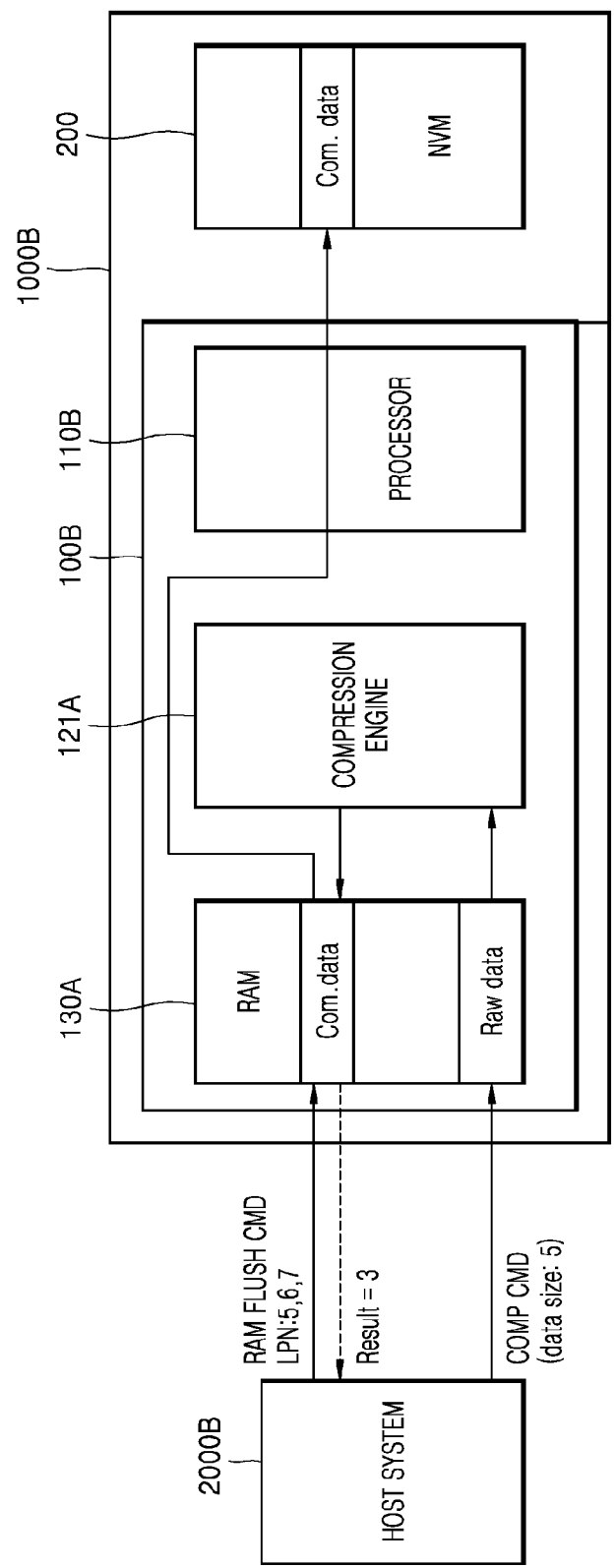
FIG. 7 is a diagram showing a signal processing flow for a data compression process, according to another embodiment of the inventive concept.

FIG. 7 is a diagram showing a signal processing flow for a data compression process using a compression engine of a memory system 1000B according to a new host command to perform a write operation, according to another embodiment of the inventive concept.

Referring to FIG. 7, memory system 1000B comprises a memory controller 100B and an NVM 200. Memory controller 100B comprises a processor 110B, a compression engine 121A, and a RAM 130A.

A host system 2000B may generate a first type of host command and a second host command. An operation of performing a compression process in memory system 1000B using the first type of host command, which is hereinafter referred to as "COMP CMD", and the second host command, which is hereinafter referred to as "RAM FLUSH CMD", is explained below. Although in FIG. 7, the COMP CMD and the RAM FLUSH CMD are transmitted from host system 2000B to memory system 1000B through different signal lines, the COMP CMD and the RAM FLUSH CMD may be transmitted through the same signal line.

Where host data Raw data, of which data size corresponds to five logical page sizes, is received in addition to the COMP CMD, processor 110B stores the host data Raw data in a first address area of RAM 130A which supports a compression function. Compression engine 121A compresses the host data stored in the first address area under the control of processor 110B, and also stores the compressed data Com.data in a second address area of RAM 130A.

Processor 110B generates information about an encoding result and transmits the information to host system 2000B. The information about the encoding result may include storage location information and size information for compressed data stored in the second address area of RAM 130A. The size information for the compressed data may correspond to three logical page sizes.

Host system 2000B generates the RAM FLUSH CMD, which comprises storage location information and size information for the compressed data Com.data and logical address information to be mapped to the compressed data Com.data, and transmits the generated RAM FLUSH CMD to memory system 1000B. The logical address information to be mapped to the compressed data Com.data may be converted into three logical page numbers LPN 5, LPN 6, and LPN 7.

Where the RAM FLUSH CMD is received from host system 2000B, processor 110B of memory system 1000B converts the logical address information in the RAM FLUSH CMD into physical address information. Also, processor 110B controls memory system 1000B so as to write the compressed data Com.data stored in the second address area of RAM 130A into a storage location of NVM 200 that corresponds to the physical address information, based on the storage location information in the RAM FLUSH CMD.

Figure 8:
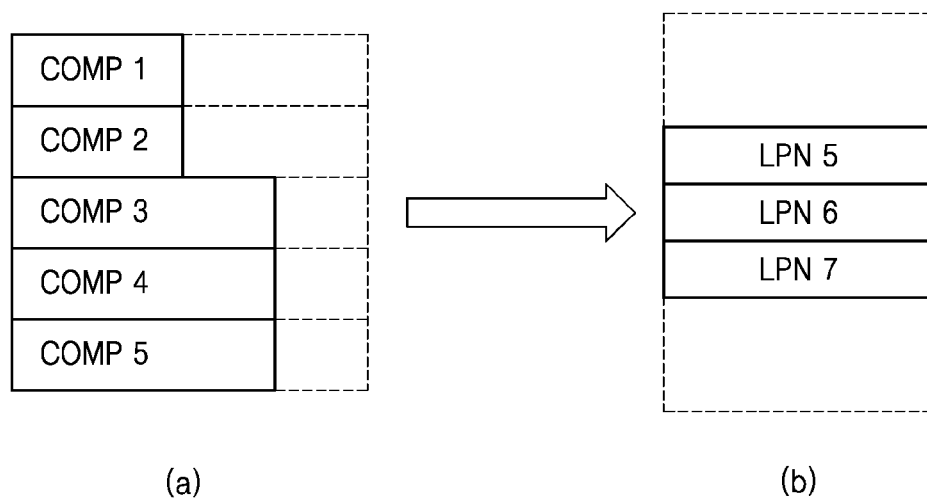
FIG. 8 is a diagram showing the form of data compressed in a memory controller of FIG. 7, and the form of data stored in a nonvolatile memory of FIG. 7, according to an embodiment of the inventive concept.

For example, the form of data compressed by compression engine 121A of memory controller 100B is illustrated in FIG. 8, part (a). In FIG. 8, part (a), compression results for host data with five logical page sizes which is transmitted together with the COMP CMD are denoted by COMP 1 through COMP 5.

Data Com.data that is stored in NVM 200 has a form as shown in FIG. 8, part (b). That is, referring to FIG. 8, part (b), data of three logical pages LPN 5 through LPN 7 is stored in NVM 200.

Accordingly, the compression efficiency of the compression process scheme according to the embodiment of FIG. 7 is improved compared to the compression process scheme according to the embodiment of FIG. 5. In addition, in the embodiment of FIG. 7, a process of converting a logical address into a physical address is simplified.

Figure 9:
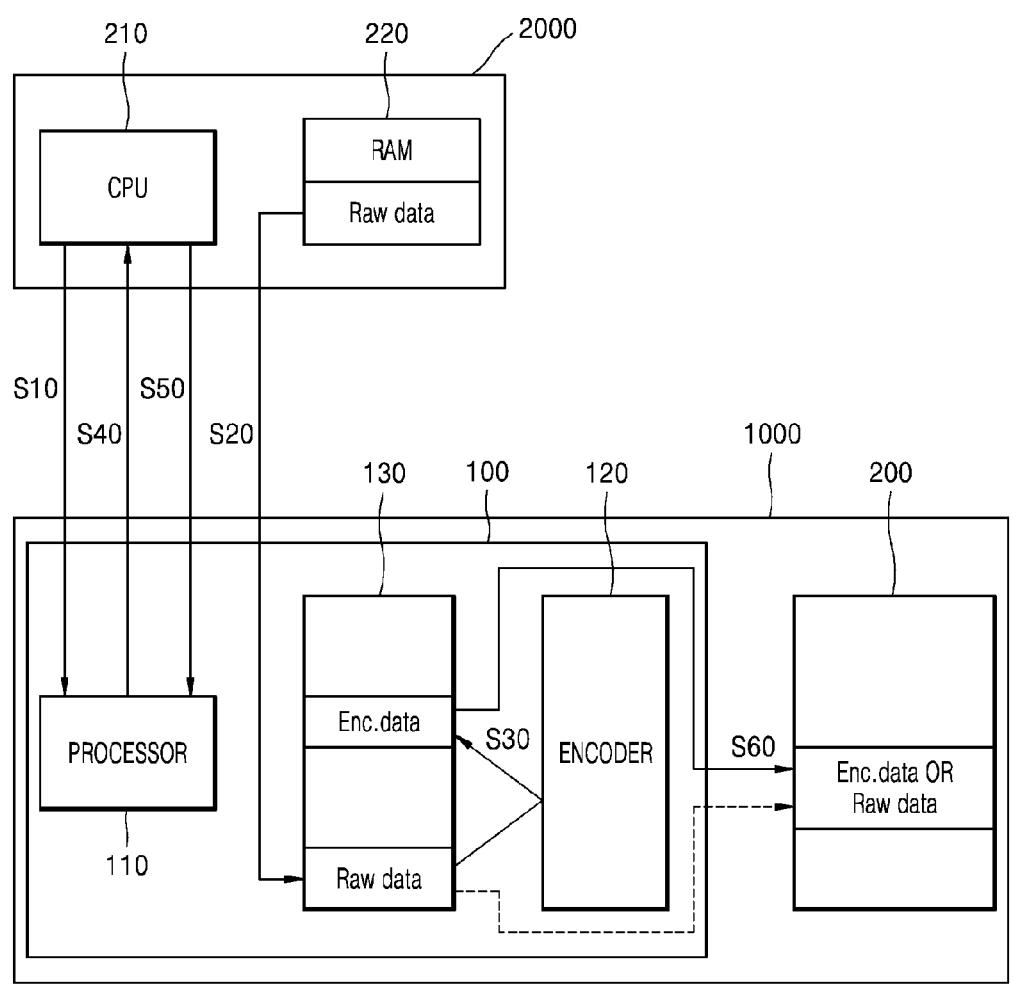
FIG. 9 is a diagram showing signal processing of an encoding operation and a writing operation in the data processing system illustrated in FIG. 2, according to an embodiment of the inventive concept.

FIG. 9 is a diagram showing a main signal processing for explaining a process of performing an encoding operation and a writing operation in data processing system 10000 illustrated in FIG. 2, according to an embodiment of the inventive concept. Although in FIG. 9, a first type of host command and a second host command are transmitted from host system 2000 to memory system 1000 through different signal lines, the first type of host command and the second host command may be transmitted through the same signal line.

CPU 210 of host system 2000 generates the first type of host command based on a type of host data to be stored in memory system 1000, and transmits the first type of host command to processor 110 of memory system 1000 (operation S10). The first type of host command is a command for performing an operation of writing host data into a storage area of RAM 130 allocated to support a compression function or an encryption function in memory system 1000. For example, the first type of host command may be a first A host command COMP CMD, a first B host command ENCR CMD, or a first C host command COMP/ENCR CMD.

After transmitting the first type of host command to memory system 1000, host system 2000 reads host data Raw data to be processed by the first type of host command from RAM 220, and transmits the host data Raw data to memory system 1000 (operation S20). Processor 110 of memory system 1000 stores the host data Raw data in a first address area of RAM 130 which supports a compression function or/and an encryption function according to the first type of host command.

As described with reference to FIGS. 3A through 3C, RAM 130 may include storage areas allocated as shown in RAM 130A, RAM 130B, or RAM 130C.

Where the first A host command COMP CMD is received, processor 110 stores the host data in the first address area of RAM 130A, the first A address area of RAM 130B, or the first A address area of RAM 130C.

Where the first B host command ENCR CMD is received, processor 110 stores the host data in the first address area of RAM 130A, the first B address area of RAM 130B, or the first B address area of RAM 130C.

Where the first C host command COMP/ENCR CMD is received, processor 110 stores the host data in the first C address area of RAM 130C.

Next, encoder 120 encodes data stored in the first address area of RAM 130, and stores the encoded data in a second address area of RAM 130 (operation S30). That is, under the control of processor 110, encoder 120 may encode data read from the first address area of RAM 130 and then store the encoded data in the second address area of RAM 130.

As described with reference to FIGS. 4A through 4E, one of various types of encoders 120A through 120H may be applied to encoder 120.

Where the first address area of RAM 130A is allocated to support a compression function, the host data stored in the first address area of RAM 130A is compressed by compression engine 121A, 121B, or 121C of encoder 120A, 120C, or 120G, one of compression engines 121A-1 through 121A-N of encoder 120D, or one of compression engines 121B-1 through 121B-N of encoder 120E or 120H under the control of processor 110, and the compressed host data is stored in the second address area of RAM 130A. Where encoder 120 comprises multiple compression engines, one of the compression engines are selected based on compression engine designation information in the first A host command COMP CMD or the first C host command COMP/ENCR CMD under the control of processor 110.

Where the first address area of RAM 130A is allocated to support an encryption function, the host data stored in the first address area of RAM 130A is encrypted by encryption engine 122A, 122B, or 122C of encoder 120B, 120C, or 120E, one of encryption engines 122A-1 through 122A-M of encoder 120F, or one of encryption engines 122B-1 through 122B-M of encoder 120G or 120H under the control of processor 110, and the encrypted host data is stored in the second address area of RAM 130A. Where encoder 120 comprises multiple encryption engines, one of the encryption engines is selected based on encryption engine designation information in the first B host command ENCR CMD or the first C host command COMP/ENCR CMD under the control of processor 110.

As another example, host data stored in the first A address area of RAM 130B is compressed by compression engine 121A, 121B, or 121C of encoder 120A, 120C, or 120G, one of compression engines 121A-1 through 121A-N of encoder 120D, or one of compression engines 121B-1 through 121B-N of encoder 120E or 120H under the control of processor 110, and the compressed host data is stored in the second address area of RAM 130B.

As another example, host data stored in the first B address area of RAM 130B is encrypted by encryption engine 122A, 122B, or 122C of encoder 120B, 120C, or 120E, one of encryption engines 122A-1 through 122A-M of encoder 120F, or one of encryption engines 122B-1 through 122B-M of encoder 120G or 120H under the control of processor 110, and the encrypted host data is stored in the second address area of RAM 130B.

As another example, host data stored in the first C address area of RAM 130C is compressed by compression engine 121A, 121B, or 121C of encoder 120A, 120C, or 120G, one of compression engines 121A-1 through 121A-N of encoder 120D, or one of compression engines 121B-1 through 121B-N of encoder 120E or 120H under the control of processor 110, and the compressed host data is stored in the first B address area of RAM 130C.

As another example, host data stored in the first A address area of RAM 130C is compressed by compression engine 121A, 121B, or 121C of encoder 120A, 120C, or 120G, one of compression engines 121A-1 through 121A-N of encoder 120D, or one of compression engines 121B-1 through 121B-N of encoder 120E or 120H under the control of processor 110, and the compressed host data is stored in the second address area of RAM 130C.

As another example, host data stored in the first B address area of RAM 130C is encrypted by encryption engine 122A, 122B, or 122C of encoder 120B, 120C, or 120E, one of encryption engines 122A-1 through 122A-M of encoder 120F, or one of encryption engines 122B-1 through 122B-M of encoder 120G or 120H under the control of processor 110, and the encrypted host data is stored in the second address area of RAM 130C.

In this manner, data Enc.data encoded by encoder 120 is stored in the second address area of RAM 130.

After the encoding for the host data is processed in memory system 1000 according to the first type of host command, processor 110 generates information about an encoding result and transmits the information to CPU 210 of host system 2000 (operation S40).

Where memory system 1000 performs an encoding process according to the first A host command COMP CMD, the first B host command ENCR CMD, or the first C host command COMP/ENCR CMD, processor 110 may generate information about an encoding result, which comprises storage location information and size information for the encoded data Enc.data that is stored in the second address area of RAM 130.

Where memory system 1000 performs an encoding process according to the first A host command COMP CMD, processor 110 may generate information about an encoding result, which comprises storage location information and size information for at least one selected from among the host data Raw data stored in the first address area of RAM 130 and the encoded data stored in the second address area of RAM 130.

Where memory system 1000 performs an encoding process according to the first A host command COMP CMD, processor 110 may determine target data, based on a compression rate of the encoding process, from among the host data Raw data stored in the first address area of RAM 130 and the encoded data stored in the second address area of RAM 130. Where the compression rate is greater than or equal to a first threshold value, the encoded data Enc.data is determined as the target data. Otherwise, the host data Raw data is determined as the target data. Then, processor 110 may generate information about an encoding result, which comprises storage location information and size information for the determined target data.

CPU 210 of host system 2000 generates a second host command RAM FLUSH CMD based on the received information about the encoding result, and transmits second host command RAM FLUSH CMD to processor 110 of memory system 1000 (operation S50).

As an example, CPU 210 generates second host command RAM FLUSH CMD, which comprises storage location information of RAM 130 for the encoded data Enc.data, size information for the encoded data Enc.data, and logical address information to be mapped to the encoded data Enc.data, based on the information about the encoding result.

As another example, CPU 210 generates second host command RAM FLUSH CMD, which comprises storage location information of RAM 130 for the target data, size information for the target data, and logical address information to be mapped to the target data, based on the information about the encoding result. The target data is data selected from among the encoded data Enc.data and the host data Raw data.

As another example, CPU 210 calculates a compression rate based on the information about the encoding result, and generates second host command RAM FLUSH CMD, which comprises storage location information of RAM 130 for the encoded data Enc.data, size information for the encoded data Enc.data, and logical address information to be mapped to the encoded data Enc.data, where the compression rate is greater than or equal to a first threshold value. Where the compression rate is less than the first threshold value, CPU 210 generates second host command RAM FLUSH CMD, which comprises storage location information of RAM 130 for the host data Raw data, size information for the host data Raw data, and logical address information to be mapped to the host data Enc.data.

processor 110 of memory system 1000 performs an operation of writing the encoded data Enc.data or host data Raw data stored in RAM 130 to NVM 200 based on the received second host command RAM FLUSH CMD (operation S60). In detail, processor 110 converts the logical address information in second host command RAM FLUSH CMD into physical address information. Processor 110 reads the encoded data Enc.data or the host data Raw data from RAM 130 using the storage location information in second host command RAM FLUSH CMD, and writes the read data to a storage location of NVM 200 that corresponds to the physical address information. Although in FIG. 9, the encoded data Enc.data and the host data Raw data are transmitted to NVM 200 through different signal lines, they may be transmitted through the same signal lines.

Figure 10:
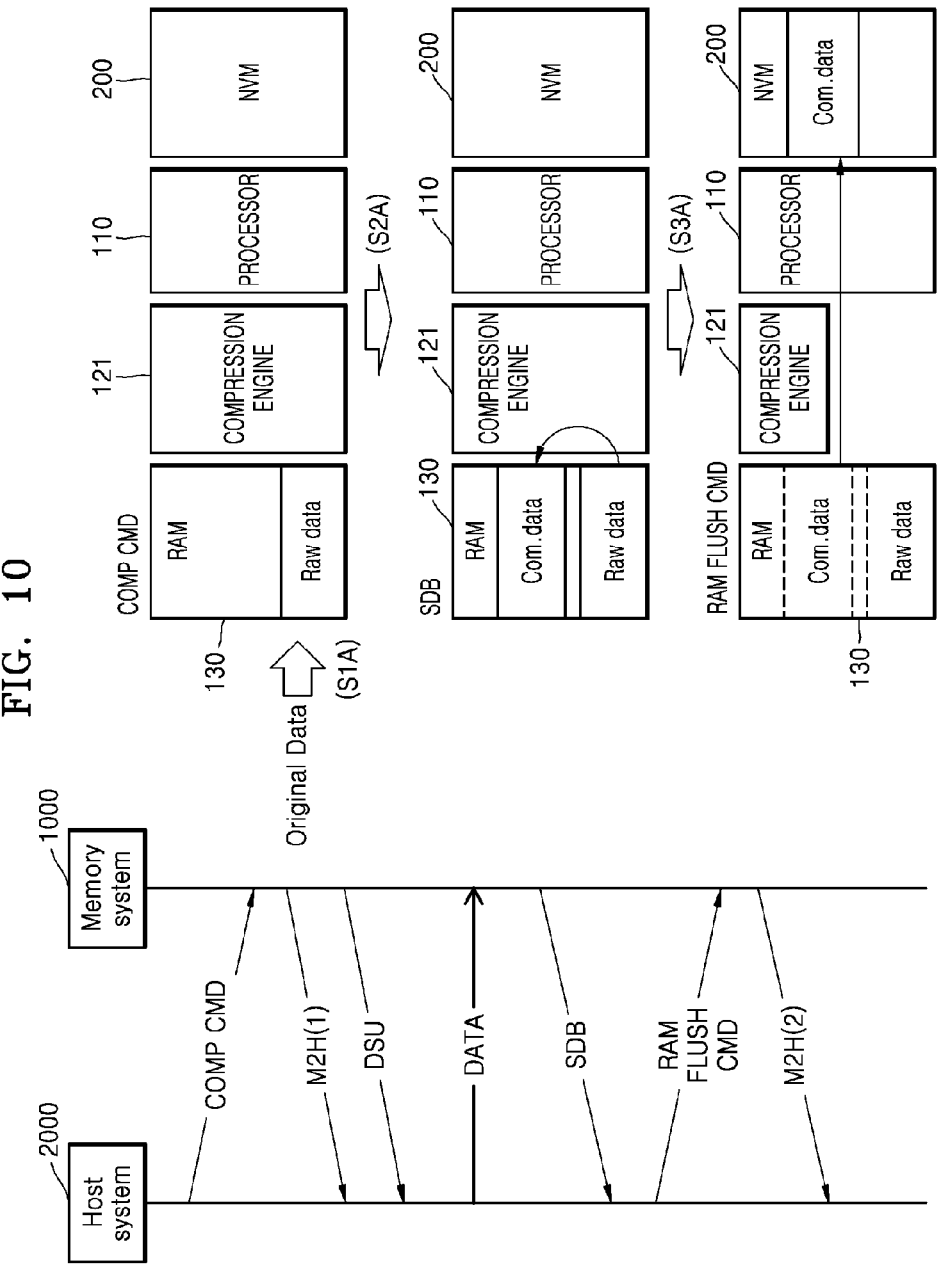
FIG. 10 is a conceptual diagram illustrating the flow of a data compression operation, a write operation, and signal processing, according to an embodiment of the inventive concept.

FIG. 10 is a conceptual diagram showing a flowchart for explaining a data compression and write operation and a main signal processing, according to an embodiment of the inventive concept.

FIG. 10 shows a process of performing a data compression and write operation using a first A host command COMP CMD and a second host command RAM FLUSH CMD. One of RAM 130A, RAM 130B, and RAM 130C illustrated in FIGS. 3A through 3C may be applied to a RAM 130 of FIG. 10. In addition, one of compression engines 121A, 121B, 121A-1 through 121A-N, and 121B-1 through 121B-N illustrated in FIGS. 4A and 4C through 4E may be applied to a compression engine 121 of FIG. 10.

Where a demand for a write operation that may support a compression function occurs, a host system 2000 transmits the first A host command COMP CMD to a memory system 1000. Where memory system 1000 normally receives the first A host command COMP CMD, memory system 1000 transmits response information M2H(1) to host system 2000.

After memory system 1000 completes preparations for reception of host data, memory system 1000 transmits information DSU notifying the completion of the preparations to host system 2000. Where host system 2000 receives the information DSU, host system 2000 transmits the host data to memory system 1000.

An original data Raw data is transmitted from host system 2000 to memory system 1000 through such a process, and a processor 110 performs an operation of storing the transmitted original data Raw data in a first address area of RAM 130 in memory system 1000, the first address area supporting a compression function (operation S1A).

Under the control of processor 110, compression engine 121 reads the original data Raw data stored in the first address of RAM 130 and compresses the read original data, and stores the compressed data Com.data in a second address area of RAM 130 (operation S2A). Next, processor 110 generates information about an encoding result, which comprises storage location information and size information of RAM 130 in which the compressed data Com.data was stored.

Next, memory system 1000 transmits the information about the encoding result to host system 2000. The information about the encoding result may be transmitted using a set device bit (SDB) message.

Host system 2000 transmits second host command RAM FLUSH CMD to memory system 100 based on the received information about the encoding result. For example, based on the received information about the encoding result, host system 2000 may generate second host command RAM FLUSH CMD, which comprises storage location information of RAM 130 for the compressed data Com.data, size information for the compressed data Com.data, and logical address information to be mapped to the compressed data Com.data, and may transmit the generated second host command RAM FLUSH CMD to memory system 1000.

Where memory system 1000 normally receives second host command RAM FLUSH CMD, memory system 1000 transmits response information M2H(2) to host system 2000.

Processor 110 of memory system 1000 performs an operation of writing the compressed data Com.data stored in the second address area of RAM 130 to NVM 200 based on second host command RAM FLUSH CMD (operation S3A). In detail, processor 110 converts the logical address information in second host command RAM FLUSH CMD into physical address information. Processor 110 reads the compressed data Com.data from RAM 130 using the storage location information in second host command RAM FLUSH CMD, and writes the read data to a storage location of NVM 200 that corresponds to the physical address information.

Figure 11:
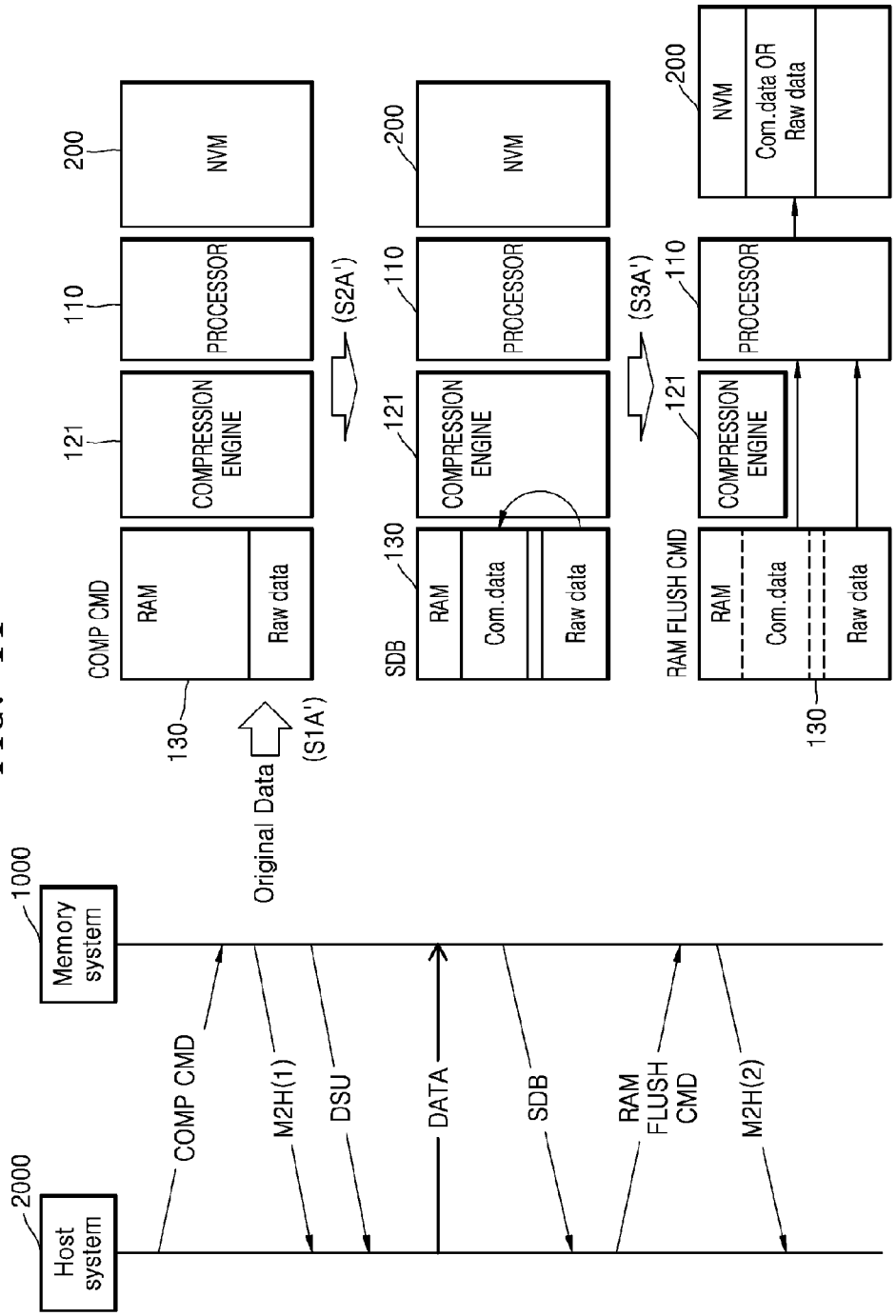
FIG. 11 is a conceptual diagram illustrating the flow of a data compression operation, a write operation, and signal processing, according to an embodiment of the inventive concept.

FIG. 11 is a conceptual diagram showing a flowchart for explaining a data compression and write operation and a main signal processing, according to another embodiment of the inventive concept.

FIG. 11 shows a process of performing a data compression and write operation using a first A host command COMP CMD and a second host command RAM FLUSH CMD. One of RAM 130A, RAM 130B, and RAM 130C illustrated in FIGS. 3A through 3C may be applied to a RAM 130 of FIG. 11. In addition, one of compression engines 121A, 121B, 121C, 121A-1 through 121A-N, and 121B-1 through 121B-N illustrated in FIGS. 4A, 4C through 4E, 4G, and 4H may be applied to a compression engine 121 of FIG. 11.

Where a demand for a write operation that may support a compression function occurs, a host system 2000 transmits the first A host command COMP CMD to a memory system 1000. Where memory system 1000 normally receives the first A host command COMP CMD, memory system 1000 transmits response information M2H(1) to host system 2000.

After memory system 1000 completes preparations for reception of host data, memory system 1000 transmits information DSU notifying the completion of the preparations to host system 2000. Where host system 2000 receives the information DSU, host system 2000 transmits the host data to memory system 1000.

A host data, i.e., an original data Raw data is transmitted from host system 2000 to memory system 1000 through such a process, and a processor 110 performs an operation of storing the transmitted original data Raw data in a first address area of RAM 130 in memory system 1000, the first address area supporting a compression function (operation S1A').

Under the control of processor 110, compression engine 121 reads the original data Raw data stored in the first address of RAM 130 and compresses the read original data, and stores the compressed data Com.data in a second address area of RAM 130 (operation S2A').

Then, as an example, processor 110 may generate information about an encoding result, which comprises storage location information and size information for at least one selected from among the original data Raw data stored in the first address area of RAM 130 and the compressed data Com.data stored in the second address area of RAM 130.

As another example, processor 110 may determine target data, based on a compression rate of the compression process, from among the original data Raw data stored in the first address area of RAM 130 or the compressed data Com.data stored in the second address area of RAM 130. Where the compression rate is greater than or equal to a first threshold value, the compressed data Com.data is determined as the target data. Otherwise, the original data Raw data is determined as the target data. Then, processor 110 may generate information about an encoding result, which comprises storage location information of RAM 130 and size information for the determined target data.

Next, memory system 1000 transmits the information about the encoding result to host system 2000. The information about the encoding result may be transmitted using a set device bit (SDB) message.

Host system 2000 transmits second host command RAM FLUSH CMD to memory system 100 based on the received information about the encoding result. Where memory system 1000 normally receives second host command RAM FLUSH CMD, memory system 1000 transmits response information M2H(2) to host system 2000.

Where information about encoding result, which comprises storage location information and size information for the original data Raw data and storage location information and size information for the compressed data Com.data, is received from memory system 1000, host system 2000 calculates a compression rate of the compressed data Com.data obtained by compressing the host data Raw data. Where the calculated compression rate is greater than or equal to a first threshold value, host system 2000 determines the compressed data Com.data as the target data. Otherwise, host system 2000 determines the original data Raw data as the target data. Next, host system 2000 generates second host command RAM FLUSH CMD, which comprises storage location information of RAM 130 for the determined target data, size information for the determined target data, and logical address information to be mapped to the target data, and transmits the generated second host command to memory system 1000.

Where information about the encoding result, which comprises storage location information and size information for the target data determined according to the compression rate, is received from memory system 1000, host system 2000 generates second host command RAM FLUSH CMD, which comprises storage location information of RAM 130 for the target data, size information for the determined target data, and logical address information to be mapped to the target data, and transmits the generated second host command to memory system 1000.

Where second host command RAM FLUSH CMD is transmitted to memory system 1000, processor 110 performs an operation of writing the original data Raw data stored in the first address area of RAM 130 or compressed data Com.data stored in the second address area of RAM 130 to NVM 200, based on second host command RAM FLUSH CMD (operation S3A'). In detail, processor 110 converts the logical address information in second host command RAM FLUSH CMD into physical address information. Processor 110 reads the original data Raw data or the compressed data Com.data from RAM 130 using the storage location information of RAM 130 for the target data, which is in second host command RAM FLUSH CMD, and writes the read data into a storage location of NVM 200 that corresponds to the physical address information.

Figure 12:
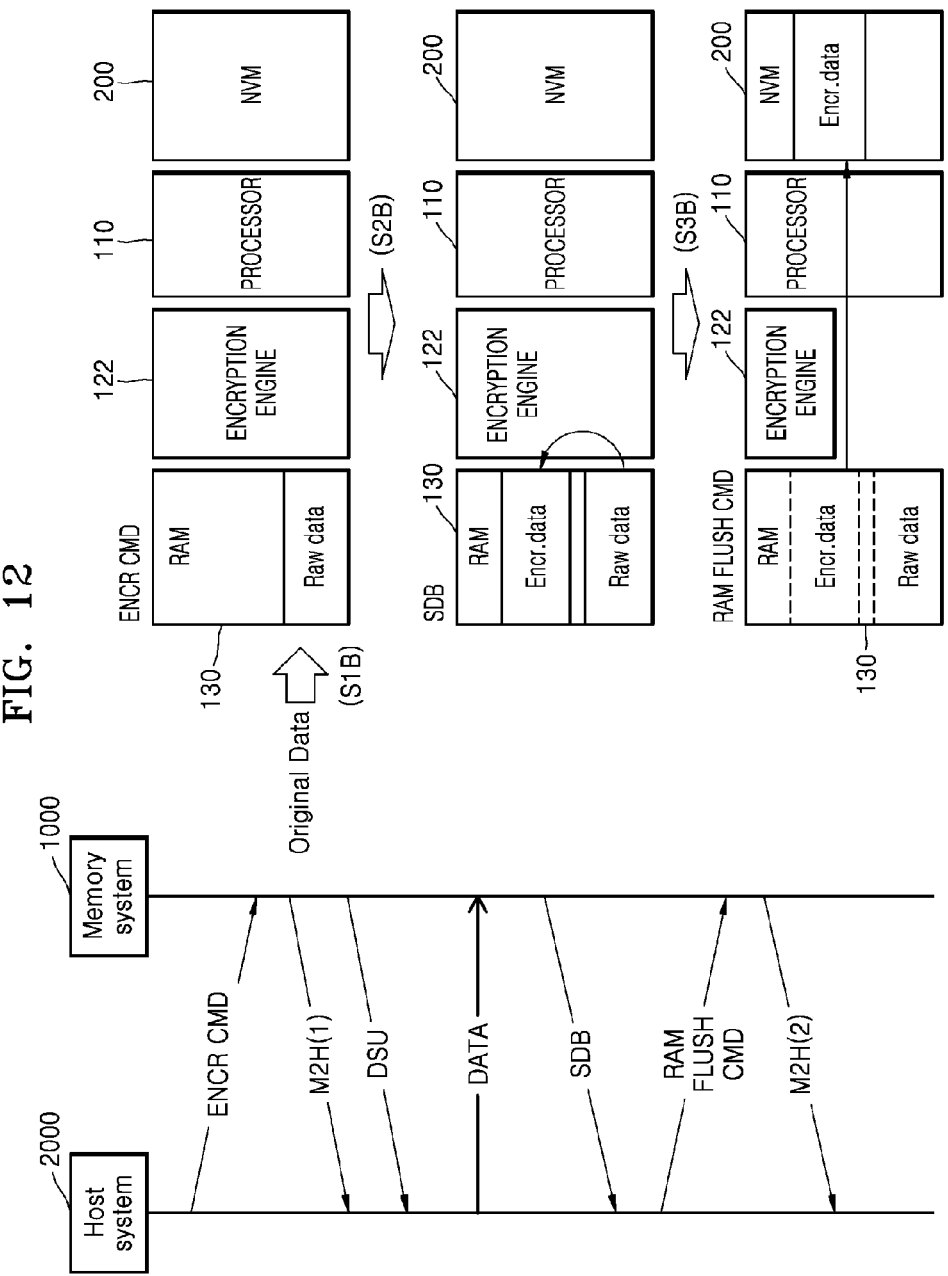
FIG. 12 is a conceptual diagram illustrating the flow of a data compression operation, a write operation, and signal processing, according to an embodiment of the inventive concept.

FIG. 12 is a conceptual diagram illustrating the flow of a data compression operation, a write operation, and signal processing, according to an embodiment of the inventive concept. FIG. 12 shows a process of performing a data encryption and write operation using a first B host command ENCR CMD and a second host command RAM FLUSH CMD. One of RAM 130A, RAM 130B, and RAM 130C illustrated in FIGS. 3A through 3C may be applied to a RAM 130 of FIG. 12. In addition, one of encryption engines 122A, 122B, 122C, 122A-1 through 122A-M, and 122B-1 through 122B-M illustrated in FIGS. 4B, 4C, 4E, 4F, 4G, and 4H may be applied to an encryption engine 122 of FIG. 12.

Where a demand for a write operation that supports an encryption function occurs, a host system 2000 transmits the first B host command ENCR CMD to a memory system 1000. Where memory system 1000 normally receives the first B host command ENCR CMD, memory system 1000 transmits response information M2H(1) to host system 2000.

After memory system 1000 completes preparations for reception of host data, memory system 1000 transmits information DSU notifying the completion of the preparations to host system 2000. Where host system 2000 receives the information DSU, host system 2000 transmits the host data to memory system 1000.

Original data Raw data is transmitted from host system 2000 to memory system 1000 through such a process, and a processor 110 performs an operation of storing the transmitted original data Raw data in a first address area of RAM 130 in memory system 1000, the first address area supporting an encryption function (operation S1B).

Under the control of processor 110, encryption engine 122 reads the original data Raw data stored in the first address area of RAM 130 and encrypts the read original data, and stores the encrypted data Encr.data in a second address area of RAM 130 (operation S2B). Next, processor 110 generates information about an encoding result, which comprises storage location information and size information of RAM 130 in which the encrypted data Encr.data was stored.

Next, memory system 1000 transmits the information about the encoding result to host system 2000. The information about the encoding result may be transmitted using a set device bit (SDB) message.

Host system 2000 transmits second host command RAM FLUSH CMD to memory system 100 based on the received information about the encoding result. Where memory system 1000 normally receives second host command RAM FLUSH CMD, memory system 1000 transmits response information M2H(2) to host system 2000.

For example, based on the received information about the encoding result, host system 2000 may generate second host command RAM FLUSH CMD, which comprises storage location information of RAM 130 for the encrypted data Encr.data, size information for the encrypted data Encr.data, and logical address information to be mapped to the encrypted data Encr.data, and may transmit the generated second host command RAM FLUSH CMD to memory system 1000.

Where second host command RAM FLUSH CMD is transmitted to the memory system, processor 110 of memory system 1000 forms an operation of writing the encrypted data Encr.data stored in the second address area of RAM 130 to NVM 200, based on second host command RAM FLUSH CMD (operation S3B). In detail, processor 110 converts the logical address information in second host command RAM FLUSH CMD into physical address information. Processor 110 reads the encrypted data Encr.data from RAM 130 using the storage location information in second host command RAM FLUSH CMD, and writes the read data into a storage location of NVM 200 that corresponds to the physical address information.

Figure 13:
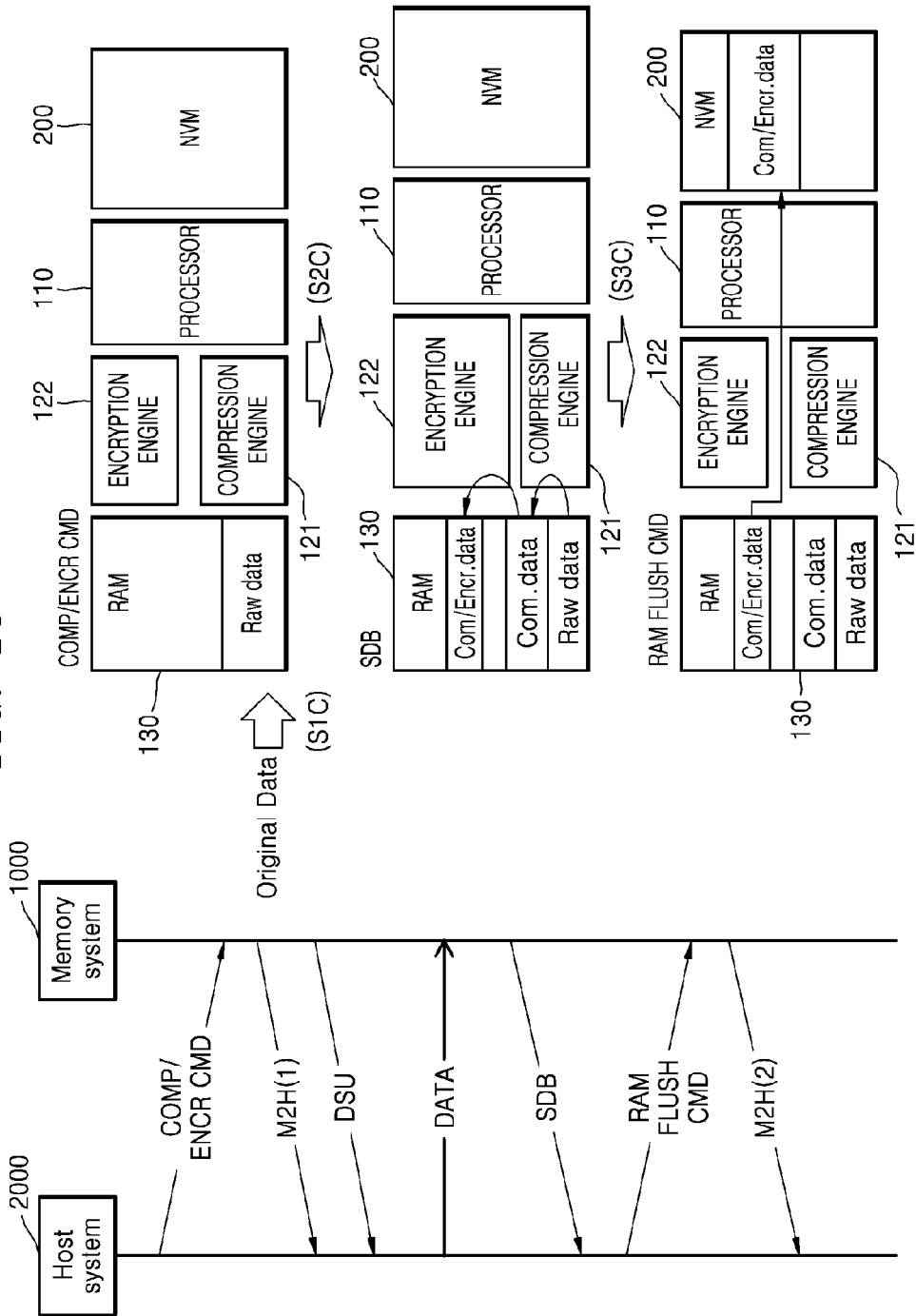
FIG. 13 is a conceptual diagram illustrating the flow of a data compression operation, a write operation, and signal processing, according to an embodiment of the inventive concept.

FIG. 13 is a conceptual diagram illustrating a flow of a data compression/encryption and write operation and a main signal processing, according to another embodiment of the inventive concept.

FIG. 13 shows a process of performing a data compression/encryption and write operation using a first C host command COMP/ENCR CMD and a second host command RAM FLUSH CMD. RAM 130C illustrated in FIG. 3C may be applied to RAM 130 of FIG. 13. One of compression engines 121A, 121B, 121C, 121A-1 through 121A-N, and 121B-1 through 121B-N illustrated in FIGS. 4A, 4C through 4E, 4G, and 4H may be applied to a compression engine 121 of FIG. 13. In addition, one of encryption engines 122A, 122B, 122C, 122A-1 through 122A-M, and 122B-1 through 122B-M illustrated in FIGS. 4B, 4C, 4E, 4F, 4G, and 4H may be applied to an encryption engine 122 of FIG. 13.

Where a demand for a write operation that supports a compression and encryption function occurs, a host system 2000 transmits the first C host command COMP/ENCR CMD to a memory system 1000. Where memory system 1000 normally receives the first C host command COMP/ENCR CMD, memory system 1000 transmits response information M2H(1) to host system 2000.

After memory system 1000 completes preparations for reception of host data, memory system 1000 transmits information DSU notifying the completion of the preparations to host system 2000. Where host system 2000 receives the information DSU, host system 2000 transmits the host data to memory system 1000.

Original data Raw data, i.e., host data, is transmitted from host system 2000 to memory system 1000 through such a process, and a processor 110 performs an operation of storing the transmitted original data Raw data in a first address area of RAM 130 in memory system 1000, the first address area supporting a compression and encryption function (operation S1C). The original data Raw data may be stored in the first C address area of RAM 130C.

After sequentially performing a compression process and an encryption process on the original data Raw data stored in the first address area using compression engine 121 and encryption engine 122 under the control of processor 110, the compressed and encrypted data is stored in the second address area of RAM 130 (operation S2C).

Specifically, under the control of processor 110, compression engine 121 reads the host data Raw data stored in the first address of RAM 130, which supports the compression and encryption function, and compresses the read host data, and stores the compressed data Com.data in the first address area of RAM 130, which supports an encryption function. For example, the compressed data Com.data is stored in the first B address area of RAM 130C, which supports the encryption function. Next, under the control of processor 110, encryption engine 122 reads the compressed data Com.data stored in the first B address area of RAM 130, which supports the encryption function, and encrypts the read compressed data, and stores the compressed and encrypted data Com/Encr.data in a second address area of RAM 130 (operation S3C). Next, processor 110 generates information about an encoding result, which comprises storage location information and size information of RAM 130 in which the compressed and encrypted data Com/Encr.data was stored.

Next, processor 110 generates information about an encoding result, which comprises storage location information and size information of RAM 130 in which the compressed and encrypted data Com/Encr.data was stored.

Next, memory system 1000 transmits the information about the encoding result to host system 2000. The information about the encoding result may be transmitted using a set device bit (SDB) message.

Host system 2000 transmits second host command RAM FLUSH CMD to memory system 100 based on the received information about the encoding result. Where memory system 1000 normally receives second host command RAM FLUSH CMD, memory system 1000 transmits response information M2H(2) to host system 2000. For example, based on the received information about the encoding result, host system 2000 may generate second host command RAM FLUSH CMD, which comprises storage location information of RAM 130 for the compressed and encrypted data Com/Encr.data, size information for the compressed and encrypted data Com/Encr.data, and logical address information to be mapped to the compressed and encrypted data Com/Encr.data, and may transmit the generated second host command RAM FLUSH CMD to memory system 1000.

Where second host command RAM FLUSH CMD is transmitted to the memory system, processor 110 of memory system 1000 forms an operation of writing the compressed and encrypted data Com/Encr.data stored in the second address area of RAM 130 to NVM 200, based on second host command RAM FLUSH CMD (operation S3C). In detail, processor 110 converts the logical address information in second host command RAM FLUSH CMD into physical address information. Processor 110 reads the compressed and encrypted data Com/Encr.data from RAM 130 using the storage location information in second host command RAM FLUSH CMD, and writes the read data into a storage location of NVM 200 that corresponds to the physical address information.

Figure 14:
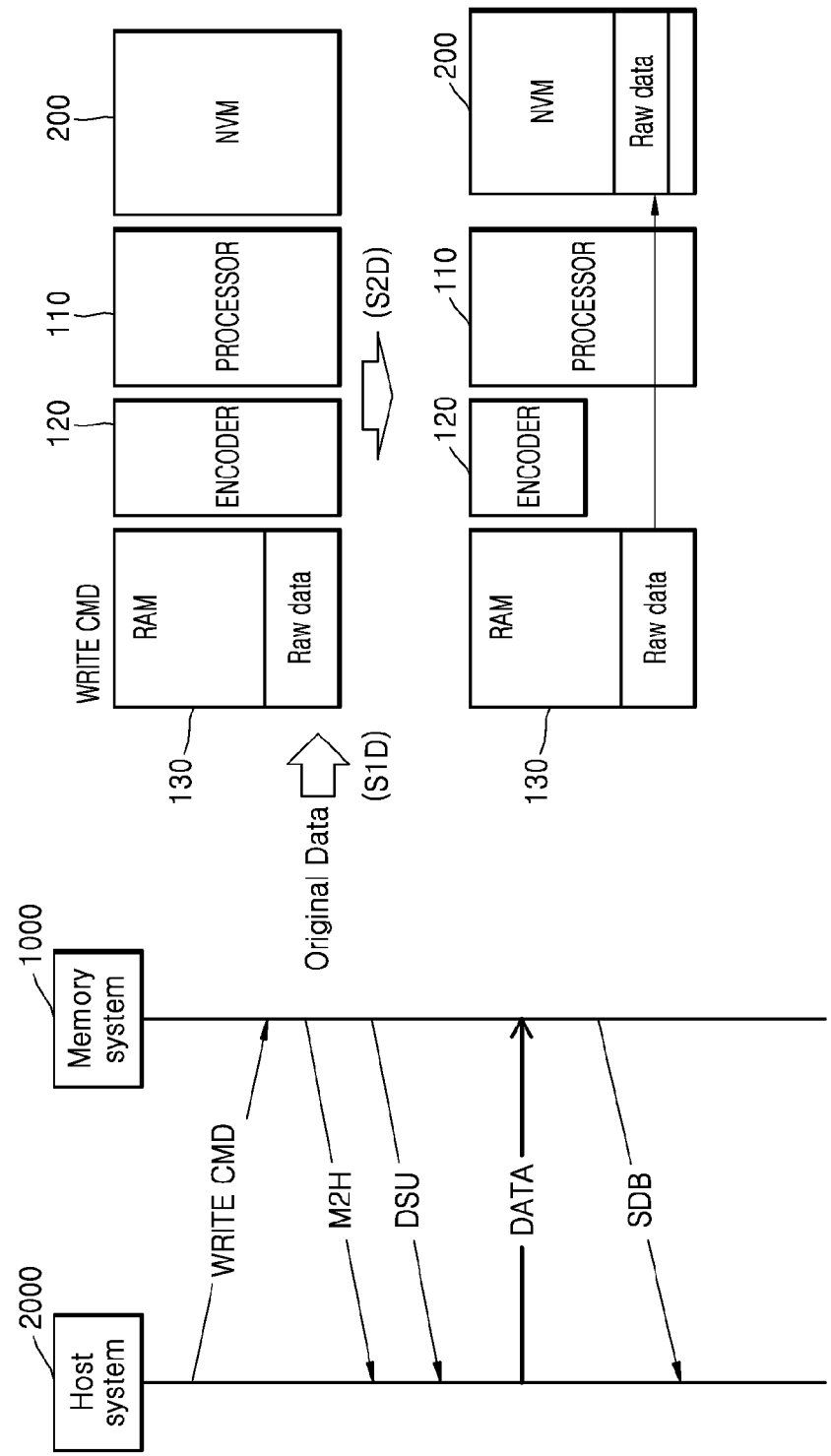
FIG. 14 is a conceptual diagram illustrating the flow of a data compression operation, a write operation, and signal processing, according to an embodiment of the inventive concept.

FIG. 14 is a conceptual diagram showing a flowchart for explaining a write operation without a compression process and also showing a main signal processing, according to another embodiment of the inventive concept.

Where an expected compression rate for host data which may support a compression function and on which a write operation is to be performed is less than a second threshold value, host system 2000 generates a write command WRITE CMD instead of the first A host command COMP CMD. Write command WRITE CMD comprises logical address information and size information, which is to be mapped to the host data to be written.

FIG. 14 shows a process of performing a write operation using the write command WRITE COM. One of RAM 130A, RAM 130B, and RAM 130C illustrated in FIGS. 3A through 3C may be applied to RAM 130 of FIG. 14. In addition, one of encoders 120A through 120H illustrated in FIGS. 4A through 4H may be applied to an encoder 120 of FIG. 14.

Where write command WRITE CMD is generated in host system 2000 according to a demand for a write operation that may support a compression function, host system 2000 transmits write command WRITE CMD to a memory system 1000. Where memory system 1000 normally receives write command WRITE CMD, memory system 1000 transmits response information M2H to host system 2000.

After memory system 1000 completes preparations for reception of host data, memory system 1000 transmits information DSU notifying the completion of the preparations to host system 2000. Where host system 2000 receives the information DSU, host system 2000 transmits the host data to memory system 1000.

An original data Raw data, i.e., host data, is transmitted from host system 2000 to memory system 1000 through such a process, and a processor 110 performs an operation of storing the transmitted original data Raw data in a second address area of RAM 130 in memory system 1000 (operation S1D).

Processor 110 of memory system 1000 forms an operation of writing the host data Raw data stored in the second address area of RAM 130 to NVM 200, based on write command WRITE CMD (operation S2D). In detail, processor 110 converts the logical address information in write command WRITE CMD into physical address information. Then, processor 110 reads the host data Raw data stored in the second address area of RAM 130, and writes the read host data into a storage location of NVM 200 that corresponds to the physical address information.

Where memory system 1000 normally completes a write operation according to write command WRITE CMD, memory system 1000 transmits response information, which notifies the completion of the write operation, as a set device bit (SDB) message to host system 2000.

Figure 15:
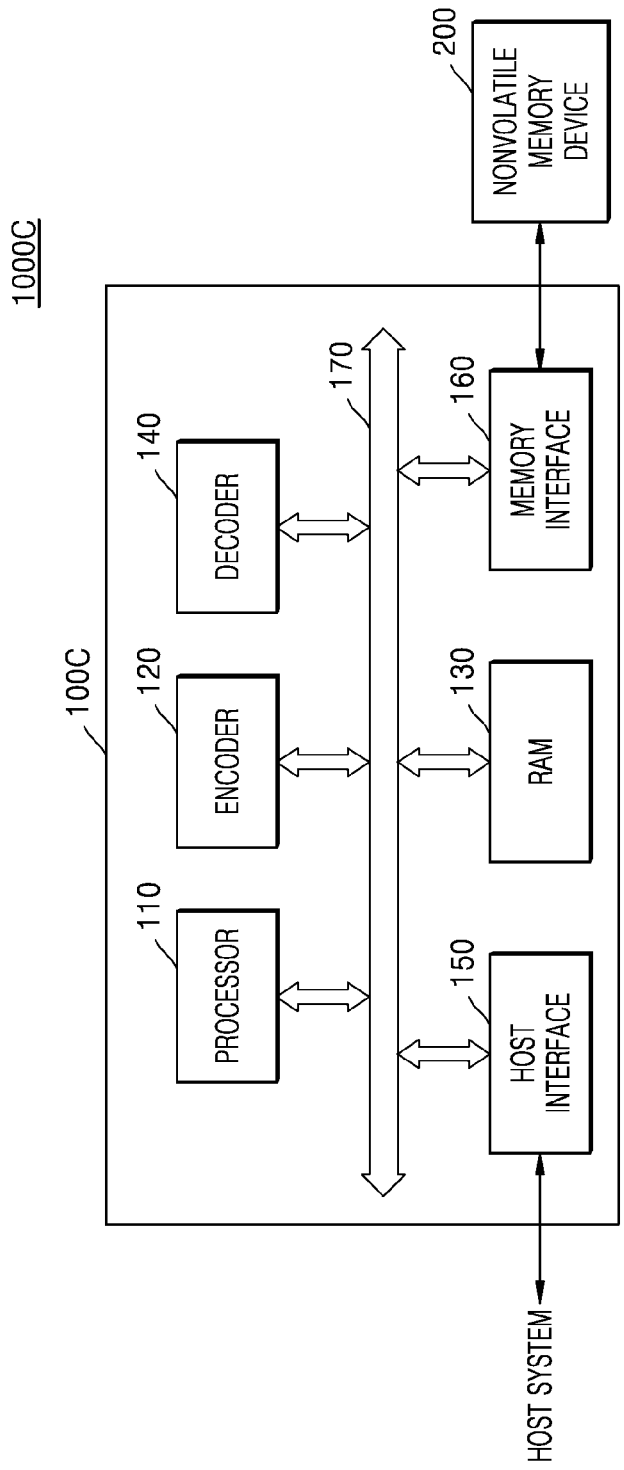
FIG. 15 is a block diagram of a memory system according to an embodiment of the inventive concept.

FIG. 15 is a block diagram of a memory system 1000C according to an embodiment of the inventive concept.

Referring to FIG. 15, memory system 1000C comprises a memory controller 100C and a nonvolatile memory device 200. For example, a solid state drive (SSD) may be implemented using memory system 1000C. The SSD is also referred to as a solid state disc.

nonvolatile memory device 200 may be a flash memory device, a PRAM, an FRAM, an MRAM, etc. For example, nonvolatile memory device 200 may include a single flash chip or multiple flash memory chips.

Memory controller 100C comprises a processor 110, an encoder 120, a RAM 130, a decoder 140, a host interface 150, a memory interface 160, and a bus 170. Processor 110 is electrically connected to encoder 120, RAM 130, decoder 140, host interface 150, and memory interface 160 via bus 170. Bus 170 serves as a transmission path via which data is transmitted among components of memory controller 100C. Processor 110 controls all operations of memory system 1000C. In detail, processor 110 controls memory system 1000C to decrypt a command received from a host system and to perform an operation according to a result of decryption.

Processor 110 provides a read command and an address to nonvolatile memory device 200 where a read operation is performed, and processor 110 provides a write command, an address, and data to nonvolatile memory device 200 where a write operation is performed. Processor 110 performs an operation of converting logical address information received from the host system into physical address information using metadata.

The metadata is information generated by memory system 1000C to manage nonvolatile memory device 200. The metadata as management information comprises mapping table information that is used in converting a logical address into a physical address of nonvolatile memory device 200. For example, the metadata may include page mapping information that is required to perform address mapping in units of page. In addition, the metadata may also include information for managing a storage space of nonvolatile memory device 200.

Data transmitted from the host system and data processed by memory controller 100C, or data read from nonvolatile memory device 200 may be temporarily stored in RAM 130. In addition, the metadata read from nonvolatile memory device 200 may also be stored in RAM 130. RAM 130 may be dynamic RAM (DRAM), static RAM (SRAM), or the like.

For example, RAMs 130A through 130C, of which storage spaces are allocated as illustrated in FIGS. 3A through 3C, respectively, may be applied to RAM 130. The data read from nonvolatile memory device 200 may be stored in a second address area of RAM 130.

Various types of encoders 120A through 120H illustrated in FIGS. 4A through 4H may be applied to encoder 120.

Decoder 140 decodes the data read from nonvolatile memory device 200. Where the data read from nonvolatile memory device 200 is compressed data, decoder 140 restores the compressed data to original data before compression. Where the data read from nonvolatile memory device 200 is encrypted data, decoder 140 restores the encrypted data to original data before encryption.

Host interface 150 comprises a protocol for exchanging data with the host system, i.e., host system 2000 described above, connected to memory system 1000C, and connects memory system 1000C and the host system. Host interface 140 may be an advanced technology attachment (ATA) interface, a serial advanced technology attachment (SATA) interface, a parallel advanced technology attachment (PATA) interface, a universal serial bus (USB) or a serial attached small computer system (SAS) interface, a small computer system interface (SCSI), an embedded multimedia card (eMMC) interface, or a Unix file system (UFS) interface. However, aspects of the inventive concept are not limited thereto. In detail, host interface 150 may exchange a command, an address, and data with the host system according to control of processor 110.

Memory interface 160 is electrically connected to nonvolatile memory device 200. Memory interface 160 may be configured to support an interface with a NAND flash memory chip or a NOR flash memory chip. Memory interface 160 may be configured in such a way that software and hardware interleaving operations may be selectively performed via multiple channels.

Where power is supplied to memory system 1000C, processor 110 controls memory system 1000A to read the metadata stored in nonvolatile memory device 200 and to store the metadata in RAM 130. Processor 110 controls memory system 1000C to update the metadata stored in RAM 130 according to an operation of changing the metal data in nonvolatile memory device 200. Processor 110 controls memory system 1000C to write the metal data stored in RAM 130 into nonvolatile memory device 200 before memory system 1000C is powered off.

Where processor 110 receives a first type of host command through host interface 150, processor 110 stores host data received through host interface 150 in a first address area of RAM 130 according to the first type of host command.

Encoder 120 compresses or/and encrypts the host data based on a compression function or an encryption function designated in the first address area of RAM 130, in which the host data is stored, and stores the compressed and/or encrypted host data in the second address area of RAM 130.

Next, processor 110 generates information about en encoding result, and transmits the information about the encoding result to the host system through host interface 150.

In addition, where processor 110 receives a second host command, i.e., second host command RAM FLUSH CMD, through host interface 150, processor 110 performs an operation of writing the encoded data or host data stored in RAM 130 into nonvolatile memory device 200 through memory interface 160.

Operations of processor 110, encoder 120, and RAM 130 of memory controller 100C illustrated in FIG. 15 are substantially the same as those explained with reference to FIGS. 2 and 9 through 14, and thus, redundant descriptions thereof will be omitted.

Figure 16:
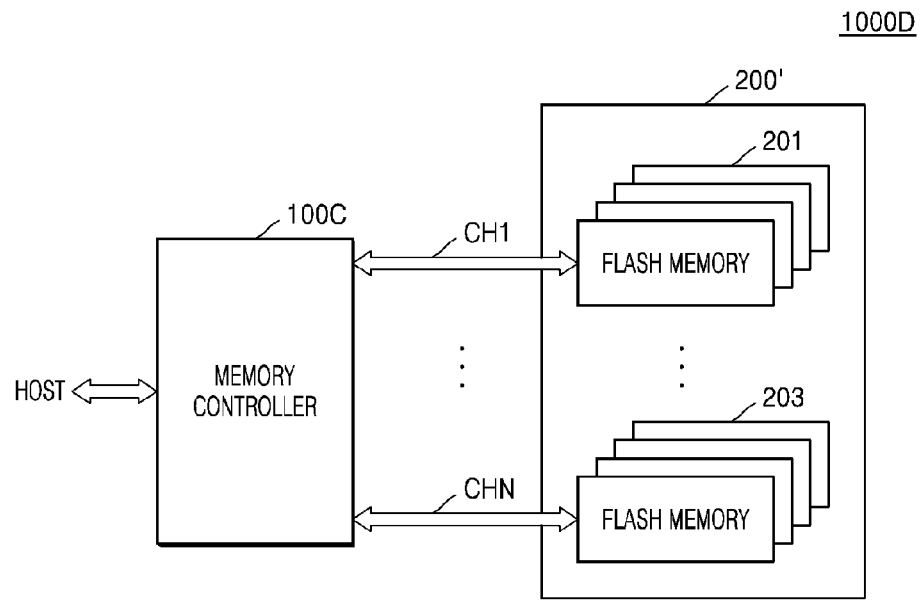
FIG. 16 is a block diagram of a memory system comprising multiple channels, according to another embodiment of the inventive concept.

FIG. 16 is a block diagram of a memory system 1000D in which nonvolatile memory device 200 illustrated in FIG. 15 comprises multiple memory chips so that multiple channels and multiple ways may be formed, according to another embodiment of the inventive concept.

An SSD may be implemented with memory system 1000D configured as shown in FIG. 16.

Referring to FIG. 16, a nonvolatile memory device 200' of memory system 1000D is implemented with multiple flash memory chips 201 and 203.

Memory system 1000D has N (where N is a natural number) channels and comprises four flash memory chips for each channel. Obviously, the number of flash memory chips for each channel may be variously set.

The configuration of memory controller 100C illustrated in FIG. 16 is substantially the same as that of memory controller 100C illustrated in FIG. 15, and thus, redundant descriptions thereof will be omitted.

Figure 17:
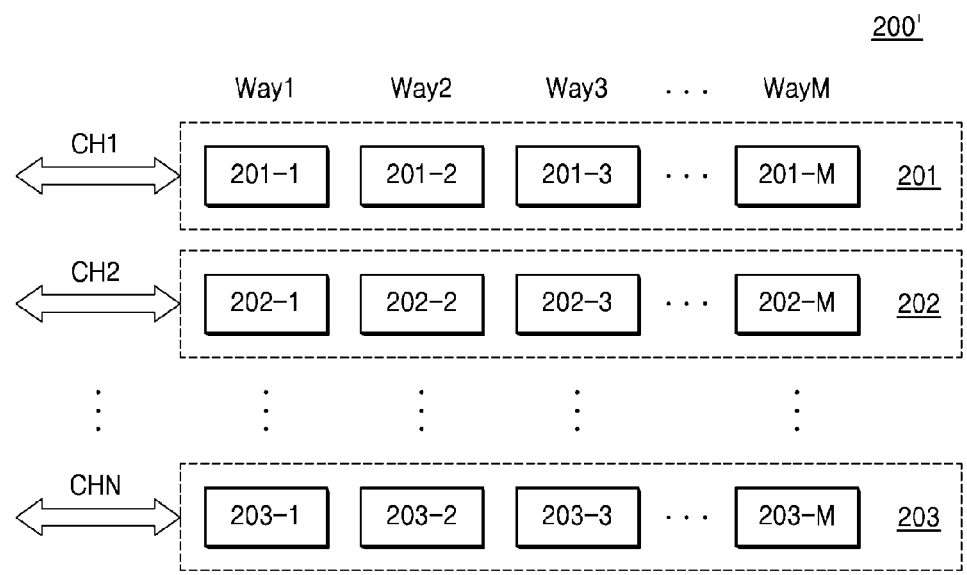
FIG. 17 is a diagram showing a configuration of channels and ways of the memory system illustrated in FIG. 16, according to an embodiment of the inventive concept.

FIG. 17 is a diagram showing a configuration of channels and ways of memory system 1000D illustrated in FIG. 16, according to an embodiment of the inventive concept.

Multiple flash memory chips 201, 202, and 203 may be electrically connected to channels CH1 to CHN. Each of the channels CH1 to CHN may refer to an independent bus that may receive or transmit a command, an address, and data from or to a corresponding flash memory chip 201 or 203. Each of flash memory chips 201, 202, and 203 that are connected to different channels CH1 to CHN, may operate independently. Flash memory chips 201, 202, and 203 that are connected to the different channels CH1 to CHN may form multiple ways way1 to wayM. M flash memory chips may be connected to M ways formed in the channels CH1 to CHN.

For example, flash memory chips 201 may form M ways way1 to wayM at a first channel CH1. Flash memory chips 201-1 to 201-M may be connected to the M ways way1 to wayM at the first channel CH1. The formation relationship between flash memory chips 201-1 to 201-M, the channels CH1 to CHN, and the M ways way1 to wayM may be applied to flash memory chips 202 and flash memory chips 203.

A way is the unit for differentiating flash memory chips that share the same channel. The flash memory chips may be differentiated according to a channel number and a way number. It may be determined based on a logical address transmitted from the host which channel and which way of a flash memory chip in which a request provided from the host is to be performed.

Figure 18:
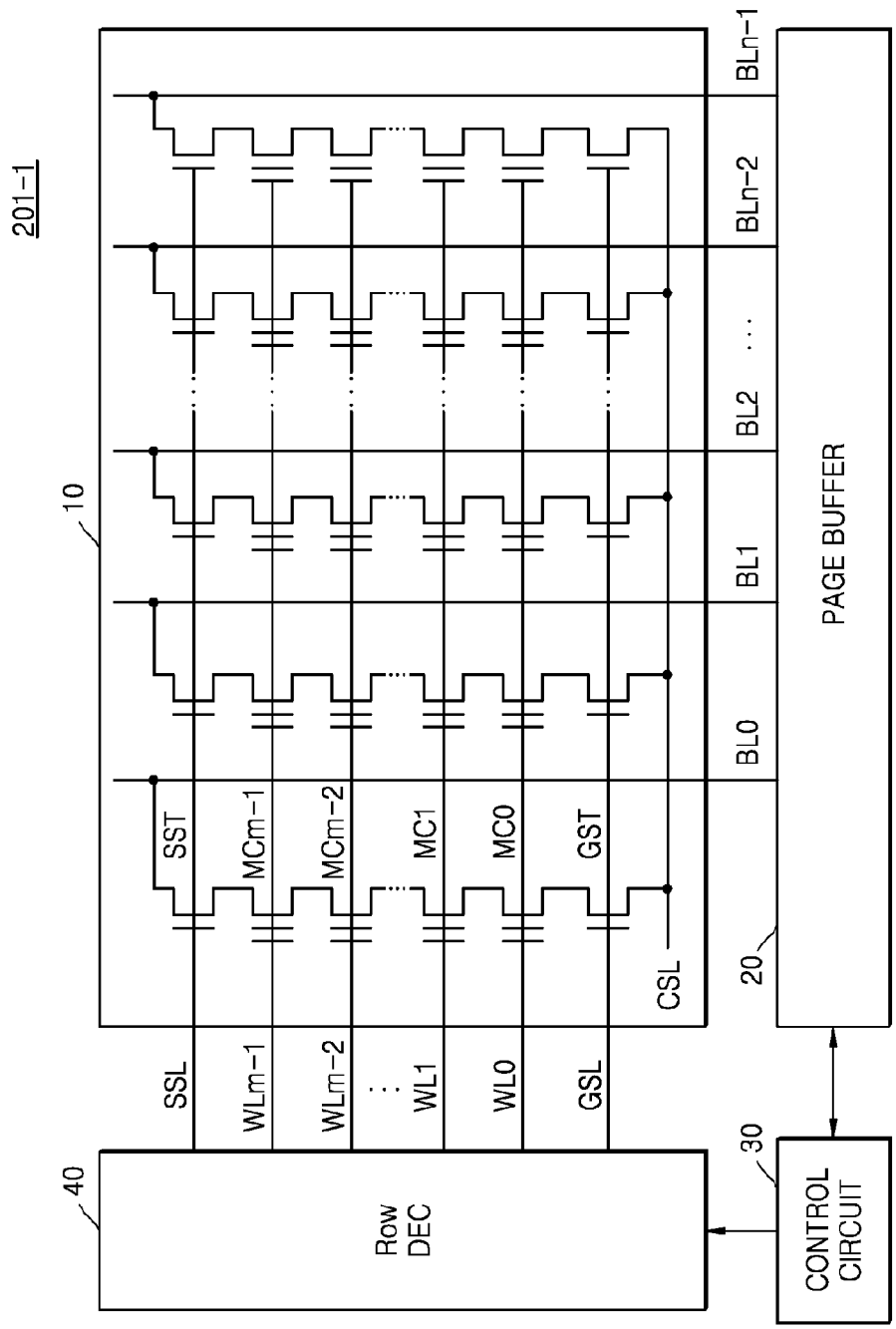
FIG. 18 is a diagram showing a detailed configuration of a flash memory chip in a memory device illustrated in FIGS. 15 and 16, according to an embodiment of the inventive concept.

FIG. 18 is a diagram of a structure of a circuit of a flash memory chip 201-1 of nonvolatile memory device 200' of FIG. 17.

Referring to FIG. 18, flash memory chip 201-1 may include a cell array 10, a page buffer 20, a control circuit 30, and a row decoder 40.

Cell array 10 is an area in which data is written in a way that a predetermined voltage is applied to a transistor. Cell array 10 comprises memory cells formed where wordlines WL0 to WLm−1 and bitlines BL0 to BLn−1 cross one another. Here, m and n are natural numbers. FIG. 18 illustrates one memory block; however, cell array 10 may include multiple memory blocks. Each of the memory blocks comprises pages corresponding to the wordlines WL0 to WLm−1. Each of the pages comprises multiple memory cells connected to a corresponding wordline of the wordlines WL0 to WLm−1. Flash memory chip 201-1 performs an erasing operation in units of block and performs a programming operation or a reading operation in units of page.

Memory cell array 10 has a cell string structure. Each cell string comprises a string selection transistor (SST) that is connected to a string selection line (SSL), multiple memory cells MC0 to MCm−1 that are connected to wordlines WL0 to WLm−1, and a ground selection transistor (GST) that is connected to a ground selection line (GSL). The SST is connected between a bitline and a string channel, and the GST is connected between the string channel and a common source line (CSL).

Page buffer 20 is connected to cell array 10 via bitlines BL0 to BLn−1. Page buffer 20 temporarily stores data to be written into the memory cells connected to a selected wordline or data read from the memory cells connected to a selected wordline.

Control circuit 30 generates various voltages required to perform a programming, reading, or erasing operation and controls all operations of flash memory chip 201-1.

Row decoder 40 is connected to cell array 10 via the selection lines SSL and GSL and wordlines WL0 to WLm−1. Row decoder 40 receives an address that is input during a programming or reading operation, and selects one wordline from among the wordlines WL0 to WLm−1 according to the input address. Memory cells in which the programming or reading operation is to be performed are connected to the selected wordline.

In addition, row decoder 40 applies voltages required to perform the programming or reading operation, for example, a program voltage, a pass voltage, a read voltage, a string selection voltage, and a ground selection voltage, to the selected wordline, unselected wordlines, and the selection lines SSL and GSL.

Each of the memory cells may store 1-bit data or 2 or more-bit data. A memory cell in which 1-bit data is stored is referred to a single level cell (SLC). A memory cell in which 2 or more-bit data is stored is referred to a multi level cell (MLC). The single level cell (SLC) has an erased state or a programmed state according to a threshold voltage.

Figure 19:
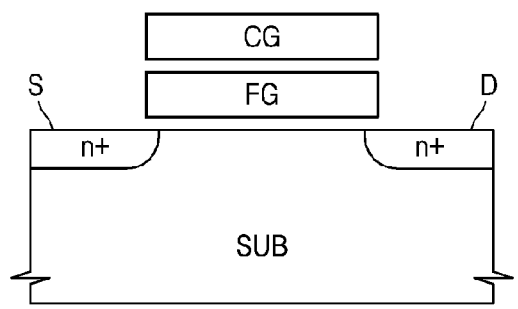
FIG. 19 is a cross-sectional view of a memory cell in a memory cell array illustrated in FIG. 18, according to an embodiment of the inventive concept.

FIG. 19 is a cross-sectional view of a memory cell in memory cell array 10 illustrated in FIG. 18.

Referring to FIG. 19, a source S and a drain D are formed in a substrate SUB, and a channel region may be disposed between the source S and the drain D. A floating gate FG is formed on the channel region, and an insulating layer, such as a tunneling insulating layer may be disposed between the channel region and the floating gate FG. A control gate CG is formed on the floating gate FG, and an insulating layer, such as a blocking insulating layer may be disposed between the floating gate FG and the control gate CG. Voltages required for programming, erasing, and reading operations on the memory cell may be applied to the substrate SUB, the source S, the drain D, and the control gate CG.

In a flash memory device, data stored in the memory cell may be read according to classification of a threshold voltage Vth of the memory cell. The threshold voltage Vth of the memory cell may be determined by an amount of electrons stored in the floating gate FG. In detail, the threshold voltage Vth of the memory cell increases as the amount of electrons in the floating gate FG increases.

Figure 20:
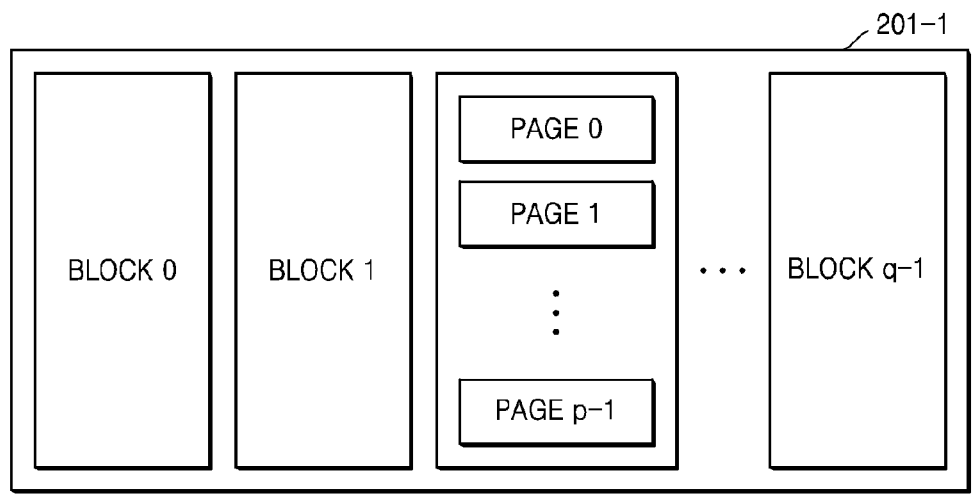
FIG. 20 is a conceptual diagram of an internal structure of the flash memory chip of FIG. 17, according to an embodiment of the inventive concept.

FIG. 20 is a conceptual diagram of an internal structure of flash memory chip 201-1 of FIG. 17.

Referring to FIG. 20, the internal structure of flash memory chip 201-1 comprises multiple blocks, each of the blocks comprising multiple pages.

Data is written in or read from flash memory chip 201-1 in units of page, and electrical erasing is performed in units of block. In addition, an electrical erasing operation on a block is required to be performed before data is written into flash memory chip 201-1. Thus, an overwriting operation in flash memory chip 201-1 may not be performed.

In a memory device in which an overwriting operation cannot be performed, user data may not be written into a desired physical region of flash memory chip 201-1. Thus, where access is requested by the host so as to perform a writing or reading operation, an address converting operation of converting a logical address, which indicates an area in which a writing or reading operation is required to be performed, into a physical address that indicates a physical area in which data is actually stored or to be stored, is required to be performed.

An operation of converting a logical address of memory system 1000A, 1000B, 1000C, or 1000D described above into a physical address will now be described with reference to FIG. 21.

Figure 21:
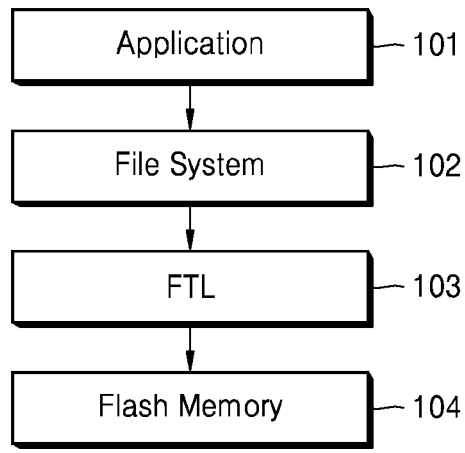
FIG. 21 is a diagram showing a software structure of a processor illustrated in FIG. 15, according to an embodiment of the inventive concept.

FIG. 21 is a diagram showing a software structure of memory system 1000A, 1000B, 1000C, or 1000D. For example, FIG. 21 illustrates a software structure where nonvolatile memory device 200 is a flash memory.

Referring to FIG. 21, memory system 1000A, 1000B, 1000C, or 1000D has a software layer structure comprising an application layer 101, a file system layer 102, a flash translation layer (FTL) 103, and a flash memory layer 104.

application layer 101 is firmware that processes data in response to a user input from the host. On application layer 101, user data is processed in response to the user input, and a command for storing the processed user data in a flash memory chip is transferred to file system layer 102.

A logical address where the user data is to be stored is allocated to file system layer 102 in response to a command transferred from application layer 101. File system layer 102 comprises a file allocation table (FAT) file system, an NTFS, or the like.

An operation of converting the logical address transferred from file system layer 102 into a physical address for performing a reading/writing operation of the flash memory chip is performed in FTL 103. The logical address may be converted in FTL 103 into the physical address using mapping information in metadata. The address converting operation on FTL 103 may be performed by processor 110 of memory controller 100A, 100B, or 100C.

Control signals for storing or reading data in or from the flash memory chip are generated in flash memory layer 104 by accessing the physical address converted from the logical address.

Figure 22:
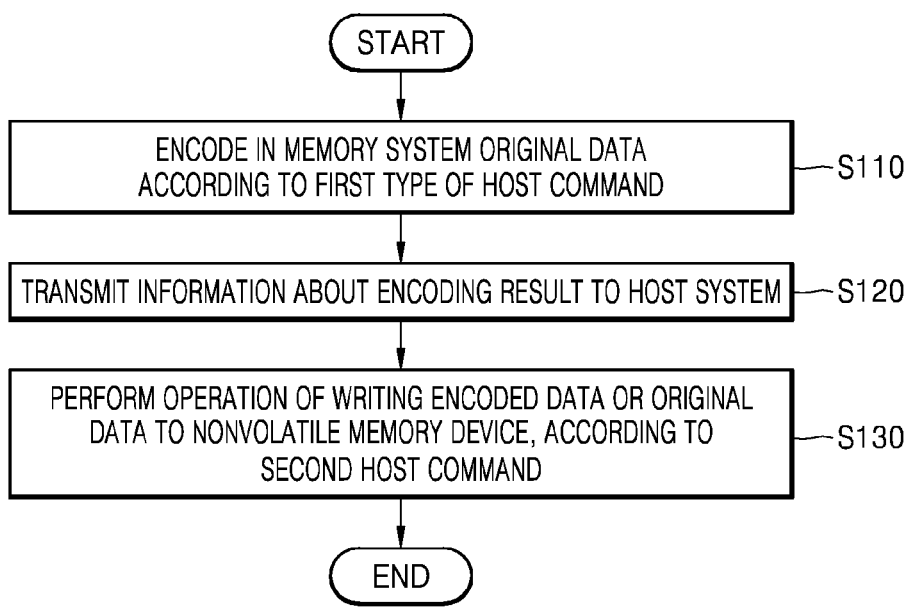
FIG. 22 is a flowchart illustrating a method of performing a write operation in a memory system, according to an embodiment of the inventive concept.

A method of performing a write operation in a memory system according to an embodiment of the inventive concept will be described with reference to a flowchart of FIG. 22. For example, a case where the flowchart of FIG. 22 is executed in the memory system of FIG. 2 is described. However, the flowchart of FIG. 22 may be executed in various electronic devices, such as an SSD, a server system, and the like, as well as the memory system of FIG. 22.

First, where a first type of host command is transmitted from host system 2000 to memory system 1000, memory system 1000 encodes an original data transmitted from host system 2000 according to the first type of host command (operation S110). The encoding process may include a data compression process, which is performed using a compression engine in encoder 120 of memory system 1000, or a data encryption process which is performed using an encryption engine in encoder 120. For example, the first type of host command may be a command for performing an operation of writing the original data transmitted from host system 2000 in a storage area of RAM 130 of memory system 1000, to the storage area supporting a compression function or an encryption function.

Next, after memory system 1000 encodes the original data according to the first type of host command, memory system 1000 transmits information about an encoding result to host system 2000 (operation S120).

As an example, based on a result of an encoding process performed in memory system 1000, memory system 1000 may generate information about an encoding result, which comprises storage location information and size information for at least one of the encoded data and the original data, and may transmit the information about the encoding result to host system 2000.

As another example, based on a result of a data compression process performed in memory system 1000 according to the first type of host command, memory system 1000 may generate information about an encoding result, which comprises storage location information and size information for target data selected from among the encoded data and the original data, and may transmit the information about the encoding result to host system 2000. In detail, the encoded data may be determined as the target data where a compression rate according to the result of the compression process is greater than or equal to a first threshold value, and the original data may be determined as the target data where the compression rate is less than the first threshold value.

Next, memory system 1000 performs an operation of writing the data encoded in memory system 1000 or the original data into nonvolatile memory device 200 of memory system 1000, according to a second host command (operation S130). In detail, memory system 1000 performs an operation of writing target data stored in RAM 130 of memory system 1000, which is designated by a second host command, into a storage location of nonvolatile memory device 200 that corresponds to physical address information which is mapped to logical address information in the second host command.

As an example, the second host command that is transmitted from host system 2000 may include storage location information for target data designated by the information about the encoding result, size information for the target data, and logical address information to be mapped to the target data.

As another example, the second host command may include storage location information for target data selected in host system 2000 according to a data compression rate from among the encoded data and the original data, size information for the target data, and logical address information to be mapped to the target data.

An operation of performing a compression process according to a first A host command COMP CMD in the operation (operation S110) of executing the encoding process is described with reference to FIG. 23.

Figure 23:
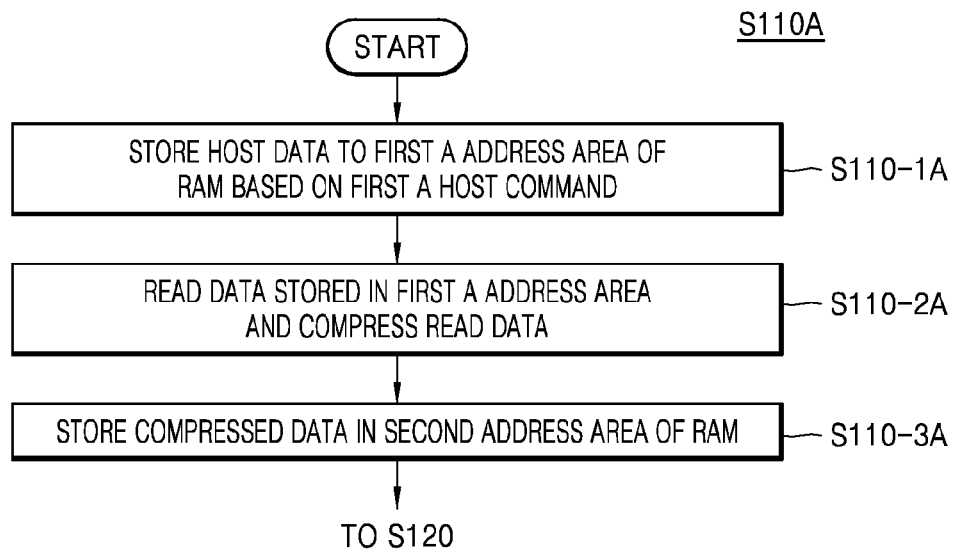
FIG. 23 is a flowchart illustrating an encoding process illustrated in FIG. 22, according to an embodiment of the inventive concept.

FIG. 23 shows a detailed flowchart of an operation (operation S110A) of executing the encoding process in memory system 1000, according to the first A host command COMP CMD.

Where the first A host command COMP CMD is transmitted from host system 2000 to memory system 1000, memory system 1000 performs an operation of storing original data transmitted from host system 2000 to a first A address area of RAM 130, based on the first A host command COMP CMD (operation S110-1A). For example, the first A address area of RAM 130 is a storage area supporting a compression function.

Memory system 1000 reads the original data stored in the first A address area of RAM 130 and compresses the read original data (operation S110-2A). For example, the compression process may be performed using a compression engine in encoder 120 of memory system 1000.

Memory system 1000 performs an operation of storing the compressed data in a second address area of RAM 130 (operation S110-3A).

Next, an operation of performing an encryption process according to a first B host command ENCR CMD in the operation (operation S110) of executing the encoding process is described with reference to FIG. 24.

Figure 24:
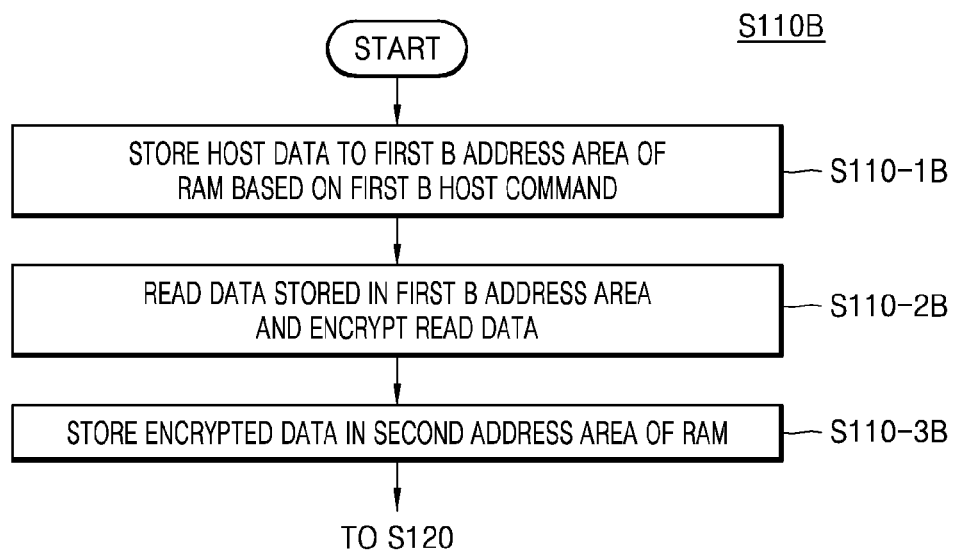
FIG. 24 is a flowchart illustrating an encoding process illustrated in FIG. 22, according to another embodiment of the inventive concept.

FIG. 24 shows a detailed flowchart of an operation (operation S110B) of executing the encoding process in memory system 1000, according to the first B host command ENCR CMD.

Where the first B host command ENCR CMD is transmitted from host system 2000 to memory system 1000, memory system 1000 performs an operation of storing the original data transmitted from host system 2000 to a first B address area of RAM 130, based on the first B host command ENCR CMD (operation S110-1B). For example, the first B address area of RAM 130 is a storage area allocated to support an encryption function.

memory system 1000 reads the original data stored in the first B address area of RAM 130 and encrypts the read original data (operation S110-2B). For example, the encryption process may be performed using an encryption engine in encoder 120 of memory system 1000.

Memory system 1000 performs an operation of storing the encrypted data in the second address area of RAM 130 (operation S110-3B).

Next, an operation of performing a compression and encryption process according to a first C host command COMP/ENCR CMD in the operation (operation S110) of executing the encoding process is described with reference to FIG. 25.

Figure 25:
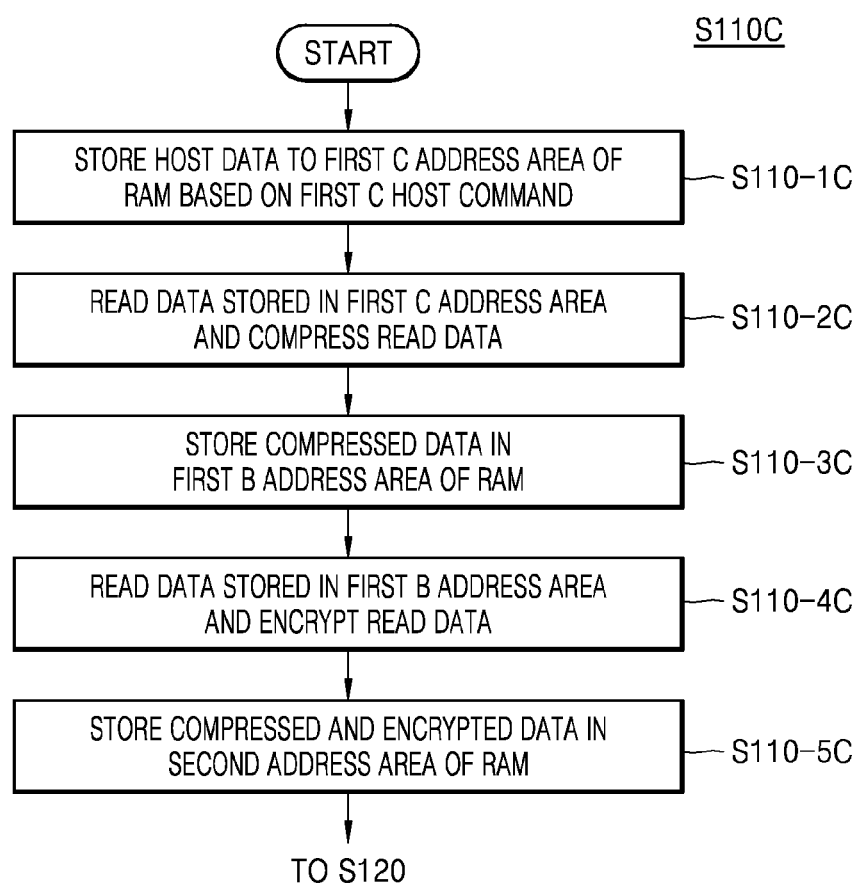
FIG. 25 is a flowchart illustrating an encoding process illustrated in FIG. 22, according to another embodiment of the inventive concept.

FIG. 25 shows a detailed flowchart of an operation (operation S110C) of executing the encoding process in memory system 1000, according to the first C host command COMP/ENCR CMD.

Where the first C host command COMP/ENCR CMD is transmitted from host system 2000 to memory system 1000, memory system 1000 performs an operation of storing the original data transmitted from host system 2000 to a first C address area of RAM 130, based on the first C host command COMP/ENCR CMD (operation S110-1C). For example, the first C address area of RAM 130 is a storage area allocated to support a compression and encryption function.

Memory system 1000 reads the original data stored in the first C address area of RAM 130 and compresses the read original data (operation S110-2C). For example, the compression process may be performed using a compression engine in encoder 120 of memory system 1000.

Next, memory system 1000 performs an operation of storing the compressed data in a first B address area of RAM 130 (operation S110-3C).

memory system 1000 reads the compressed data stored in the first B address area of RAM 130 and encrypts the read compressed data (operation S110-4C). For example, the encryption process may be performed using an encryption engine in encoder 120 of memory system 1000. Accordingly, where the encryption process is performed, compressed and encrypted data is generated.

Memory system 1000 performs an operation of storing the compressed and encrypted data in the second address area of RAM 130 (operation S110-5C).

Figure 26:
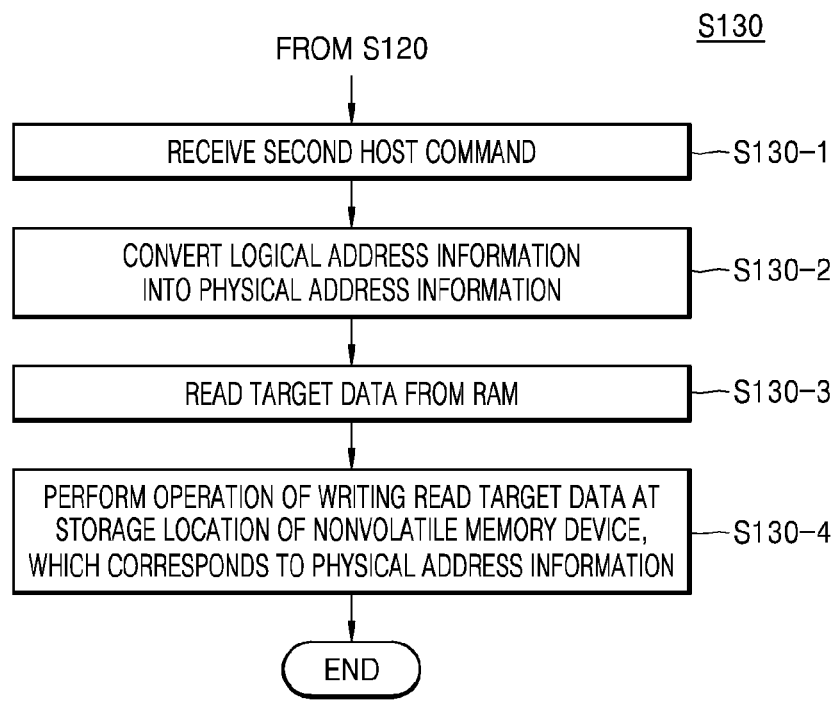
FIG. 26 is a flowchart illustrating a write execution operation illustrated in FIG. 22, according to an embodiment of the inventive concept.

FIG. 26 shows a detailed flowchart of the operation (illustrated in FIG. 22) of executing the write operation.

Memory system 1000 receives a second host command RAM FLUSH CMD based on information about an encoding result from host system 2000 (operation S130-1). As an example, second host command RAM FLUSH CMD may include storage location information for target data designated by the information about the encoding result, size information for the target data, and logical address information to be mapped to the target data. As another example, second host command RAM FLUSH CMD may include storage location information for target data selected, in host system 2000, according to a data compression rate from among the encoded data and the original data, size information for the target data, and logical address information to be mapped to the target data.

Memory system 1000 converts the logical address information in second host command RAM FLUSH CMD into physical address information (operation S130-2). For example, as described above with reference to FIG. 21, a logical address may be converted into a physical address in the FTL.

Memory system 1000 reads the target data from RAM 130 of memory system 1000 based on the storage location information for the target data, which is in second host command RAM FLUSH CMD (operation S130-3).

Figure 27:
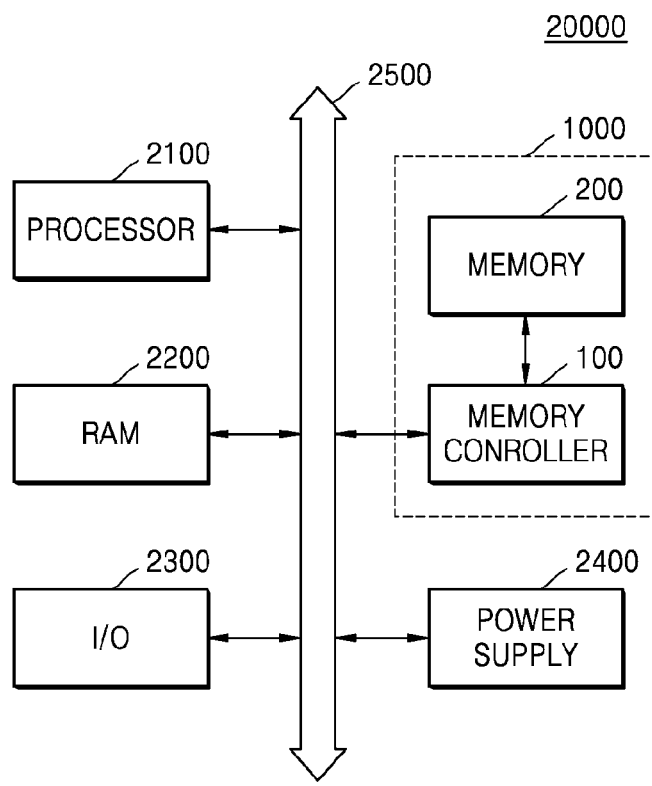
FIG. 27 is a block diagram of an electronic device comprising a memory system, according to an embodiment of the inventive concept.

Memory system 1000 performs an operation of writing the read target data to a storage location of nonvolatile memory device 200 that corresponds to the physical address information (operation S130-4). FIG. 27 is a block diagram of an electronic device 20000 comprising a memory system, according to an embodiment of the inventive concept.

Referring to FIG. 27, electronic device 20000 may include a processor 2100, a RAM 2200, an input/output (I/O) unit 2300, a power supply unit 2400, and a memory system 1000. Although not shown, electronic device 20000 may further include ports that may communicate with a video card, a sound card, a memory card, a universal serial bus (USB) device, or other electronic devices. Electronic device 20000 may be implemented via a personal computer (PC), or a portable electronic device, such as a laptop computer, a mobile phone, a personal digital assistant (PDA), or a camera.

Memory system 1000 illustrated in FIG. 27 may be memory system 1000 illustrated in FIG. 2. Thus, memory system 1000 may perform a writing operation after performing a compression process or an encryption process according to the new host command.

Processor 2100 may perform predetermined computations or tasks. In some embodiments, processor 2100 may be a micro-processor or a central processing unit (CPU). processor 2100 may perform communication with RAM 2200, I/O unit 2300, and memory system 1000 via a bus 2500, such as an address bus, a control bus, or a data bus. In some embodiments, processor 2100 may be connected to an extended bus, such as a peripheral component interconnect (PCI) bus.

RAM 2200 may store data required to perform an operation of electronic device 20000. For example, RAM 2200 may be a DRAM, a mobile DRAM, an SRAM, a PRAM, an FRAM, or an RRAM and/or MRAM.

I/O unit 2300 may include an input unit, such as a keyboard, a keypad, or mouse, and an output unit, such as a printer or a display. Power supply unit 2400 may supply an operating voltage required to perform the operation of electronic device 20000.

Figure 28:
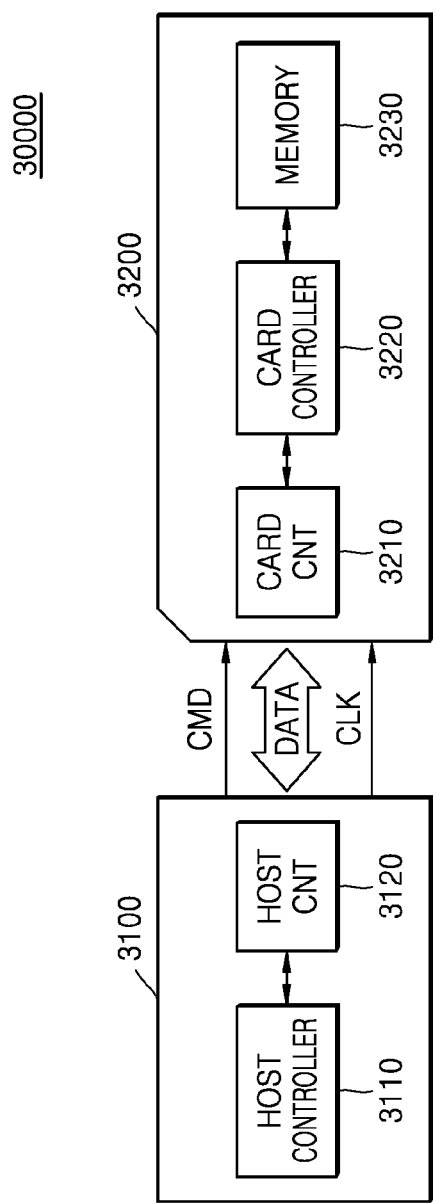
FIG. 28 is a block diagram of a memory card system comprising a memory system, according to an embodiment of the inventive concept.

FIG. 28 is a block diagram of a memory card system 30000 comprising a memory system, according to an embodiment of the inventive concept.

Referring to FIG. 28, memory card system 30000 may include a host 3100 and a memory card 3200. Host 3100 may include a host controller 3110 and a host connector 3120. Memory card 3200 may include a card connector 3210, a card controller 3220, and a memory device 3230.

Card controller 3220 and memory device 3230 illustrated in FIG. 28 may be memory controller 100 and memory device 200 illustrated in FIG. 2.

Host 3100 may write data in memory card 3200, or may read data from memory card 3200. Host controller 3110 may transmit a command CMD, a clock signal CLK that is generated by a clock generator (not shown) in host 3100, and data DATA to memory card 3200 via host connector 3120.

Card controller 5220 may encode data and may store the encoded data in memory device 3230 in response to the host command received through card connector 3210.

Memory card 3200 may be a compact flash card (CFC), a microdrive, a smart media card (SMC), a multimedia card (MMC), a security digital card (SDC), a memory stick, a USB flash memory driver, or the like.

Figure 29:
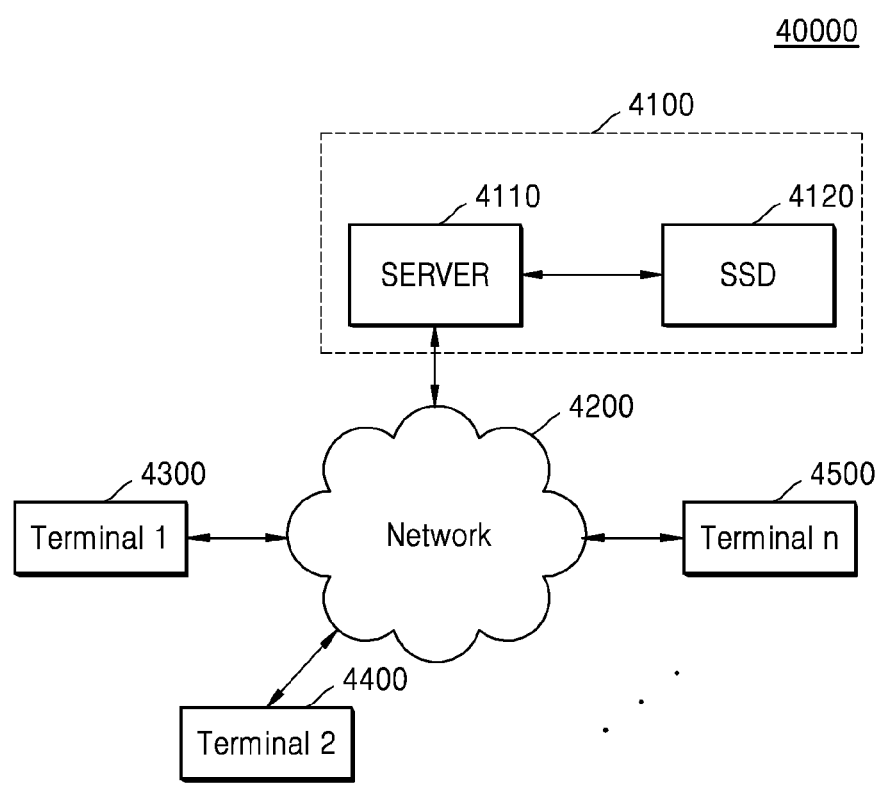
FIG. 29 is a block diagram of a network system comprising a server system, according to an embodiment of the inventive concept.

FIG. 29 is a block diagram of a network system 40000 comprising a server system 4100, according to an embodiment of the inventive concept.

Referring to FIG. 29, network system 40000 may include server system 4100 and multiple terminals 4300, 4400, and 4500 that are connected to one another via a network 4200. Server system 4100 may include a server 4110 that processes requests received from terminals 4300, 4400, and 4500 connected to network 4200, and an SSD 4120 that stores data corresponding to the requests received from terminals 4300, 4400, and 4500. In this case, SSD 4120 may be memory system 1000 illustrated in FIG. 2.

A memory system as described herein may be packaged using any of various package types. For example, a memory system may be embedded using a package on package (POP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metricquad flat pack (MQFP), a thin quad flatpack (TQFP), a small outline (SOIC), a shrink small outline package (SSOP), a thin small outline (TSOP), a thin quad flatpack (TQFP), a system in package (SIP), a multi chip package (MCP), a wafer-level fabricated package (WFP), or a wafer-level processed stack package (WSP).

The foregoing is illustrative of embodiments and is not to be construed as limiting thereof. Although a few embodiments have been described, those skilled in the art will readily appreciate that many modifications are possible in the embodiments without materially departing from the scope of the inventive concept. Accordingly, all such modifications are intended to be included within the scope of the inventive concept as defined in the claims.

What is claimed is:

1. A method of operating a memory system including a random access memory (RAM) and a non-volatile memory device, the method comprising:
   receiving a first host command and original data from a host system;
   storing the original data in the RAM in response to the first host command;
   encoding the original data stored in the RAM to generate an encoding result;
   transmitting information about the encoding result to the host system after the encoding of the original data;
   receiving a second command from the host system, wherein the second command is defined by the information about the encoding result; and thereafter,
   writing at least one of the encoding result and the original data from the RAM to the nonvolatile memory device in response to the second host command,
   wherein the second host command comprises storage location information for target data selected in the host system according to a data compression rate from among the encoding result and the original data, size information for the target data, and logical address information to be mapped to the target data.

2. The method of claim 1, wherein the storing of the original data comprises writing the original data into a storage area of the RAM, the storage area supporting a compression function or an encryption function.

3. The method of claim 1, wherein the encoding of the original data comprises at least one of selecting one of multiple compression engines in the memory system to compress the original data, and selecting one of multiple encryption engines in the memory system to encrypt the original data based on the first host command.

4. The method of claim 1, wherein the first host command is a first A host command, and the encoding of the original data comprises:
storing the original data in a first A address area of the RAM in response to the first A host command;
reading the original data stored in the first A address area and compressing the read original data to generate compressed data; and thereafter,
storing the compressed data in an address area of the RAM different from the first A address area.

5. The method of claim 1, wherein the first host command is a first B host command, and the encoding of the original data comprises:
storing the original data in a first B address area of the RAM in response to the first B host command;
reading the original data stored in the first B address area and encrypting the read original data to generate encrypted data; and thereafter,
storing the encrypted data in an address area of the RAM different from the first B address area.

6. The method of claim 1, wherein the first host command is a first C host command, and the encoding of the original data comprises:
storing the original data in a first C address area of the RAM in response to the first C host command;
reading the original data stored in the first C address area and compressing the read original data to generate compressed data;
storing the compressed data in a first B address area of the RAM different from the first C address area;
reading the compressed data stored in the first B address area and encrypting the read compressed data to generate encrypted compressed data; and
storing the encrypted compressed data in a second address area of the RAM different from the first C address area and the first B address area.

7. The method of claim 1, wherein the writing of the at least one of the encoding result and the original data to the nonvolatile memory device comprises:
receiving the second host command comprising storage location information for target data stored in the RAM, size information for the target data, and logical address information to be mapped to the target data;
converting the logical address information into physical address information;
reading target data from the RAM based on the storage location information for the target data; and
writing the read target data to a storage location of the nonvolatile memory device that corresponds to the physical address information.

8. The method of claim 1, wherein the information about the encoding result, includes location information and size information for the at least one of the encoding result and the original data stored in the RAM.

9. A memory system comprising:
a nonvolatile memory device; and
a memory controller that performs an operation of writing or reading data to or from the nonvolatile memory device, wherein the memory controller comprises:
a random access memory (RAM) comprising a first address area supporting an encoding function and a second address area storing an encoded result produced h the encoding function;
an encoder that encodes data stored in the first address area to produce the encoded result; and
a processor configured, in response to a first host command received from a host system, to:

(1) store original data received from the host system in the first address area of the RAM,
(2) control operation of the encoder to produce the encoded result and store the encoded result in the RAM;
(3) generate information about the encoding result, and
(4) control transmission of the information about the encoding result to the host system; and
the processor is further configured, in response to a second host command received from the host system after the producing of the encoded result, to:
(5) read target data from the RAM selected from among at least one of the encoding result and the original data, and
(6) write the target data to the nonvolatile memory device, wherein the second host command is generated by the host system based on the information about the encoded result received from the memory system and includes a logical address corresponding to the nonvolatile memory device, and
wherein the second host command comprises storage location information for the target data selected in the host system according to a data compression rate from among the encoding result and the original data, size information for the target data, and logical address information to be mapped to the target data.

10. The memory system of claim 9, wherein the second host command is transmitted from the host system based on the information about the encoding result, and the information about the encoding result includes storage location information and size information for at least one of the original data and the encoding result stored in the RAM.

11. The memory system of claim 9, wherein the processor generates the information about the encoding result which comprises storage location information and size information for target data selected from among the encoding result and original data stored in the RAM, based on a compression rate for the original data according to a compression process of the encoder, determines the encoding result as the target data where the compression rate is greater than or equal to a first threshold value, and determines the original data as the target data where the compression rate is less than the first threshold value.

12. The memory system of claim 9, wherein the encoder comprises one or more compression engines for compressing data or one or more encryption engines for encrypting data, and selects one of the one or more compression engines or one of the one or more encryption engines to compress or encrypt the data stored in the first address area, based on the first host command.

13. The memory system of claim 9, wherein the first address area comprises a first A address area supporting a compression function and a first B address area supporting an encryption function, and
the processor selectively stores the original data in one of the first A address area and the first B address area according to the first host command.

14. The memory system of claim 13, wherein the first address area further comprises a first C address area supporting both the compression function and the encryption function, and
the processor selectively stores the original data in one of the first A address area, the first B address area, and the first C address area according to the first host command.

15. The memory system of claim 9, wherein the encoder compresses and/or encrypts the original data stored in the first address area, and thereafter stores the compressed and/or encrypted data in the second address area.

16. The memory system of claim 9, wherein the processor converts the logical address of the second host command into physical address information, and writes the target data in the nonvolatile memory device according to the physical address information.

17. A method of operating a data processing system including a host system and a memory system, the memory system including a random access memory (RAM) and a non-volatile memory device, the method comprising:
- transmitting a first host command and original data from the host system to the memory system;
- storing the original data in the RAM in response to the first host command;
- encoding the original data stored in the RAM to generate an encoding result;
- transmitting information about the encoding result from the memory system to the host system after the encoding of the original data;
- transmitting a second command from the host system to the memory system in response to the information about the encoding result; and thereafter,
- writing at least one of the encoding result and the original data to the nonvolatile memory device in response to the second host command,
- wherein the second host command comprises storage location information for target data selected in the host system according to a data compression rate from among the encoding result and the original data, size information for the target data, and logical address information to be mapped to the target data.

* * * * *